United States Patent
Amento et al.

(10) Patent No.: US 10,820,034 B2
(45) Date of Patent: Oct. 27, 2020

(54) PROVIDING STREAMING VIDEO FROM MOBILE COMPUTING NODES

(71) Applicant: AT&T Intellectual Property I, L.P., Atlanta, GA (US)

(72) Inventors: Brian S. Amento, Port Murray, NJ (US); Robert J. Hall, Berkeley Heights, NJ (US); Kaustubh Joshi, Scotch Plains, NJ (US); Kermit Hal Purdy, Bernardsville, NJ (US); Pamela Zave, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 44 days.

(21) Appl. No.: 15/606,207

(22) Filed: May 26, 2017

(65) Prior Publication Data
US 2018/0343488 A1   Nov. 29, 2018

(51) Int. Cl.
*H04N 21/414*   (2011.01)
*H04N 21/2343*   (2011.01)
(Continued)

(52) U.S. Cl.
CPC ... *H04N 21/41407* (2013.01); *H04L 65/1069* (2013.01); *H04L 65/4084* (2013.01);
(Continued)

(58) Field of Classification Search
None
See application file for complete search history.

(56) References Cited

U.S. PATENT DOCUMENTS

| 7,080,400 B1* | 7/2006 | Navar | H04N 7/17336 348/E7.073 |
| 7,761,900 B2* | 7/2010 | Crayford | H04N 7/17318 709/223 |

(Continued)

FOREIGN PATENT DOCUMENTS

| KR | 101202029 | 11/2012 |
| WO | WO 2007109091 | 9/2007 |

(Continued)

OTHER PUBLICATIONS

TrafficLand Consumer, www.trafficland.com, TrafficLand, Inc., 2017, retrieved at https://web.archive.org/web/20141011223652/http://www.trafficland.com/consumer, on Mar. 7, 2017.

(Continued)

*Primary Examiner* — An Son P Huynh
(74) *Attorney, Agent, or Firm* — Hartman & Citrin LLC

(57) ABSTRACT

Concepts and technologies are disclosed herein for providing streaming video from mobile computing nodes. A request for streaming video captured by a mobile computing node can be received at a computer including a processor that executes a controller. The request can include a parameter associated with the streaming video. The computer can initiate transmission of an inquiry message to two or more mobile computing nodes and receive inquiry message responses from the mobile computing nodes that include the mobile computing node. The inquiry message responses can indicate that the mobile computing nodes can satisfy the parameter. The computer can create a list of the mobile computing nodes that can satisfy the parameter and provide the list to the requestor. The computer can receive a selection of the mobile computing node, and initiate delivery of a video stream to the requestor.

20 Claims, 11 Drawing Sheets

(51) Int. Cl.
  *H04L 29/06* (2006.01)
  *H04N 21/482* (2011.01)
  *H04N 21/61* (2011.01)
  *H04L 29/08* (2006.01)
  *H04N 21/6587* (2011.01)
  *H04N 21/4223* (2011.01)
  *H04N 21/437* (2011.01)
  *H04N 21/6547* (2011.01)
  *H04N 21/81* (2011.01)
  *H04N 21/472* (2011.01)

(52) U.S. Cl.
  CPC .......... *H04L 65/4092* (2013.01); *H04L 67/18* (2013.01); *H04N 21/2343* (2013.01); *H04N 21/41422* (2013.01); *H04N 21/4223* (2013.01); *H04N 21/437* (2013.01); *H04N 21/472* (2013.01); *H04N 21/482* (2013.01); *H04N 21/6131* (2013.01); *H04N 21/6547* (2013.01); *H04N 21/6587* (2013.01); *H04N 21/8153* (2013.01)

(56) References Cited

U.S. PATENT DOCUMENTS

| | | | |
|---|---|---|---|
| 8,185,927 B2 * | 5/2012 | Karaoguz | H04N 21/235 725/105 |
| 8,307,395 B2 * | 11/2012 | Issa | G06Q 10/10 725/46 |
| 8,447,875 B2 * | 5/2013 | Liu | H04L 45/125 370/312 |
| 8,830,512 B2 | 9/2014 | Coccia et al. | |
| 8,856,846 B2 * | 10/2014 | Applegate | H04N 21/2225 725/86 |
| 9,137,558 B2 * | 9/2015 | Gibbon | H04H 60/45 |
| 9,288,545 B2 * | 3/2016 | Hill | H04N 21/4312 |
| 9,367,281 B2 | 6/2016 | Hosein et al. | |
| 9,420,320 B2 * | 8/2016 | Doe | H04N 21/25866 |
| 9,454,151 B2 | 9/2016 | Srivastava et al. | |
| 9,467,515 B1 | 10/2016 | Penilla et al. | |
| 9,579,586 B2 * | 2/2017 | Bear | H04N 5/44591 |
| 9,584,834 B1 | 2/2017 | Bush et al. | |
| 9,609,374 B2 * | 3/2017 | Peterson | H04N 21/2543 |
| 9,648,098 B2 * | 5/2017 | Burba | H04L 67/104 |
| 2001/0018693 A1 * | 8/2001 | Jain | G06F 16/58 715/201 |
| 2002/0078174 A1 * | 6/2002 | Sim | H04L 47/125 709/219 |
| 2003/0093810 A1 * | 5/2003 | Taniguchi | G08B 13/19656 725/112 |
| 2003/0204856 A1 * | 10/2003 | Buxton | H04N 7/17318 725/120 |
| 2004/0045040 A1 * | 3/2004 | Hayward | G06Q 30/0277 725/135 |
| 2005/0093976 A1 * | 5/2005 | Valleriano | H04N 1/32101 348/143 |
| 2005/0222752 A1 | 10/2005 | Sokola et al. | |
| 2005/0258942 A1 * | 11/2005 | Manasseh | G07C 5/008 340/425.5 |
| 2006/0184624 A1 * | 8/2006 | Thukral | H04N 7/15 709/204 |
| 2006/0222325 A1 * | 10/2006 | Ellis | G11B 27/034 386/270 |
| 2007/0070069 A1 * | 3/2007 | Samarasekera | G06F 3/011 345/427 |
| 2007/0157281 A1 * | 7/2007 | Ellis | H04N 7/17309 725/134 |
| 2009/0025027 A1 * | 1/2009 | Craner | H04H 20/103 725/32 |
| 2009/0063994 A1 * | 3/2009 | Pickelsimer | G06F 16/735 715/753 |
| 2009/0119455 A1 * | 5/2009 | Kisel | H04L 67/104 711/118 |
| 2009/0148124 A1 * | 6/2009 | Athsani | G06Q 30/02 386/241 |
| 2009/0217329 A1 * | 8/2009 | Riedl | H04N 7/17318 725/93 |
| 2009/0231158 A1 * | 9/2009 | Grigsby | G08G 1/0962 340/902 |
| 2009/0231432 A1 * | 9/2009 | Grigsy | G08G 1/161 348/149 |
| 2009/0322874 A1 | 12/2009 | Knutson et al. | |
| 2010/0153984 A1 * | 6/2010 | Neufeld | H04H 20/103 725/14 |
| 2010/0169808 A1 * | 7/2010 | Yu | H04L 65/605 715/764 |
| 2011/0013836 A1 * | 1/2011 | Gefen | H04N 9/68 382/171 |
| 2011/0078717 A1 * | 3/2011 | Drummond | H04N 21/4586 725/14 |
| 2011/0107215 A1 * | 5/2011 | Klappert | G06F 3/167 715/716 |
| 2011/0126245 A1 * | 5/2011 | Chen | H04N 21/2181 725/93 |
| 2011/0130087 A1 * | 6/2011 | Cilli | H04N 21/2665 455/3.05 |
| 2011/0225156 A1 * | 9/2011 | Pavlik | G06F 16/48 707/737 |
| 2011/0283322 A1 * | 11/2011 | Hamano | H04N 5/44543 725/44 |
| 2012/0176413 A1 | 7/2012 | Kulik et al. | |
| 2012/0297432 A1 * | 11/2012 | Zhou | H04N 21/2181 725/93 |
| 2013/0067035 A1 | 3/2013 | Amanat et al. | |
| 2013/0138477 A1 * | 5/2013 | Wilkins | G06Q 30/0629 705/7.31 |
| 2013/0167168 A1 * | 6/2013 | Ellis | H04N 5/44543 725/12 |
| 2013/0286204 A1 * | 10/2013 | Cheng | H04N 5/33 348/148 |
| 2013/0295912 A1 * | 11/2013 | Chen | H04N 5/77 455/420 |
| 2013/0307934 A1 * | 11/2013 | Densham | G03B 31/00 348/46 |
| 2013/0325970 A1 * | 12/2013 | Roberts | H04N 21/4788 709/206 |
| 2013/0330055 A1 * | 12/2013 | Zimmermann | G06F 16/78 386/240 |
| 2014/0067937 A1 * | 3/2014 | Bosworth | H04L 65/403 709/204 |
| 2014/0081954 A1 * | 3/2014 | Elizarov | H04N 21/252 707/722 |
| 2014/0123041 A1 * | 5/2014 | Morse | G11B 27/031 715/765 |
| 2014/0123161 A1 | 5/2014 | van Coppenolle et al. | |
| 2014/0209676 A1 * | 7/2014 | Reynolds | G06Q 10/087 235/385 |
| 2014/0280530 A1 * | 9/2014 | Fremlin | H04L 67/306 709/204 |
| 2014/0282748 A1 * | 9/2014 | McNamee | H04N 21/6193 725/63 |
| 2014/0320662 A1 * | 10/2014 | McNamee | H04N 7/181 348/159 |
| 2015/0128197 A1 * | 5/2015 | Lo | H04N 21/23116 725/100 |
| 2015/0264296 A1 * | 9/2015 | Devaux | H04N 5/77 386/226 |
| 2015/0379552 A1 | 12/2015 | Kent et al. | |
| 2016/0005229 A1 | 1/2016 | Lee et al. | |
| 2016/0014324 A1 | 1/2016 | Fan et al. | |
| 2016/0036899 A1 | 2/2016 | Moody et al. | |
| 2016/0078496 A1 * | 3/2016 | Lewis | G06Q 30/0251 705/14.71 |
| 2016/0078900 A1 * | 3/2016 | Baron | H04N 21/21805 386/282 |
| 2016/0085390 A1 | 3/2016 | Audet | |
| 2016/0205434 A1 | 7/2016 | Park | |
| 2016/0214533 A1 | 7/2016 | Doyle et al. | |
| 2016/0219319 A1 * | 7/2016 | Servignat | H04N 21/25841 |

(56) References Cited

U.S. PATENT DOCUMENTS

| | | |
|---|---|---|
| 2016/0295264 A1 | 10/2016 | Yanovsky |
| 2016/0307335 A1* | 10/2016 | Perry .................... G06T 7/292 |
| 2016/0309207 A1 | 10/2016 | Bray et al. |
| 2017/0006322 A1* | 1/2017 | Dury ...................... A63F 13/49 |
| 2017/0006328 A1 | 1/2017 | Verticchio |
| 2017/0013188 A1* | 1/2017 | Kothari ............... B60R 11/0235 |
| 2017/0019712 A1 | 1/2017 | Yun |
| 2017/0180784 A1* | 6/2017 | Ward ................. H04N 21/4334 |
| 2017/0264920 A1* | 9/2017 | Mickelsen ....... H04N 21/44008 |
| 2018/0310049 A1* | 10/2018 | Takahashi .............. H04R 1/326 |
| 2019/0354634 A9* | 11/2019 | Barnes, Jr. ............ G06F 16/635 |

FOREIGN PATENT DOCUMENTS

| | | |
|---|---|---|
| WO | WO 2014123303 | 8/2014 |
| WO | WO 2015085629 | 6/2015 |
| WO | WO 2016028093 | 2/2016 |
| WO | WO 2016054835 | 4/2016 |
| WO | WO 2016207899 | 12/2016 |

OTHER PUBLICATIONS

Ghandeharizadeh et al., "C2P2: A Peer-to-Peer Network for On-Demand Automobile Information Services," Proceedings of the 15$^{th}$ International Workshop on Database and Expert Systems Applications, Aug. 30-Sep. 3, 2004, pp. 538-542, IEEE.

* cited by examiner

PROVIDING STREAMING VIDEO FROM MOBILE COMPUTING NODES

BACKGROUND

Traffic congestion and delays can be significant concerns for drivers. There are various tools available for drivers to learn about traffic congestion and delays, such as listening to traffic reports, using navigation applications, and web sites. For example, drivers can evaluate a web-based map or news report before driving to obtain route recommendations, to view traffic information, or the like. For example, the GOOGLE MAPS service from GOOGLE Inc. in Mountain View, Calif. can be used to obtain route recommendations including various options and variances in travel time for each option based on current conditions. Also, the TRAFFICLAND service from TrafficLand Incorporated in Fairfax, Va. can be used to obtain images from traffic cameras to see traffic conditions.

SUMMARY

The present disclosure is directed to providing streaming video from mobile computing nodes. The present disclosure also provides various graphical user interfaces ("GUIs") for requesting streaming video associated with mobile computing nodes, presenting lists of available mobile computing nodes, selecting a mobile computing node to provide streaming video, and/or other GUIs as are illustrated and described herein. According to various embodiments of the concepts and technologies disclosed herein, the mobile computing nodes can be configured to function as computing nodes of a cloud computing environment, but these nodes may be activated and/or torn down via commands issued from a controller and therefore can function as short-lived or non-permanent computing nodes. In various embodiments, the functionality of a mobile computing node can be provided by a vehicle, a drone, an airplane, other types of vehicles, and/or computing systems thereof.

A computing device can create a request for streaming video from one or more mobile computing nodes. The request for the streaming video can include multiple filters, requirements, or the like. For example, a user or other entity may specify, via the computing device or other device, that streaming video is requested, where the video is associated with a particular geographic location, a particular user, a particular quality (e.g., resolution, audio quality, etc.), a particular direction or field of view, a particular vehicle, or the like. The computing device can create the request and submit the request to the controller (or a server computer or other device that hosts or executes the controller). The controller can send an inquiry message to one or more mobile computing nodes. According to various embodiments, the inquiry message can be broadcast to the mobile computing nodes via a control channel or other communication channel (voice channel, data channel, or the like). The inquiry message can include the one or more filters, requirements, or the like.

In response to the inquiry message, the one or more mobile computing nodes can be activated to respond to the inquiry message. In some embodiments, the one or more mobile computing nodes can activate a data connection in response to the inquiry message, and can determine if the mobile computing node can satisfy the filters, requirements, or the like. For example, if a request for streaming video includes a resolution desired, the mobile computing node can be configured to determine if a video device of a vehicle or other entity associated with the mobile computing node is capable of capturing video at the requested resolution, if the data connection supports consistent transmission of the video at the requested resolution, if the camera view matches the requested view, or the like. If the mobile computing node can provide the video as requested and/or can meet the requirements as requested, the mobile computing node can respond to the inquiry message.

The controller can identify one or more mobile computing nodes that can provide the requested video, and compile a list for presentation to the computing device. The list can include a list of the capable and/or available mobile computing nodes, thumbnails that can correspond to recent (or current) views associated with the camera of the mobile computing nodes, and/or other information. In some embodiments, the list can be presented as a map view, and each of the mobile computing nodes (and associated thumbnails) can be presented at locations on the map that correspond to geographic locations of the mobile computing nodes in the real world. A user or other entity can select a mobile computing node, and the controller can set up a streaming video session between the mobile computing node and the computing device. In some embodiments, the controller can create a container for video from the mobile computing node, initiate a streaming data session between the mobile computing node and the container, and initiate a streaming data session between the computing device and the container, thereby delivering data from the mobile computing node to the computing device According to one aspect of the concepts and technologies disclosed herein, a system is disclosed. The system can include a processor and a memory. The memory can store computer-executable instructions that, when executed by the processor, cause the processor to perform operations. The operations can include receiving, from a requestor, a request for streaming video captured by a mobile computing node of two or more mobile computing nodes. The request can include a parameter associated with the streaming video. The operations also can include initiating transmission of an inquiry message to the two or more mobile computing nodes and receiving inquiry message responses from mobile computing nodes including the mobile computing node. The inquiry message responses can indicate that the mobile computing nodes can satisfy the parameter. The operations also can include creating a list of the mobile computing nodes, providing the list of the mobile computing nodes to the requestor, receiving, from the requestor, a selection of the mobile computing node, and initiating delivery of a video stream to the requestor. The video stream can be obtained from the mobile computing node.

In some embodiments, the two or more mobile computing nodes can be inactive before the transmission of the inquiry message and the two or more mobile computing nodes can wake in response to receiving the inquiry message. In some embodiments, the inquiry message can be transmitted to the two or more mobile computing nodes by way of a broadcast message that can be sent over a control channel. In some embodiments, initiating delivery of the video stream can include creating a container for the video stream; instructing the mobile computing node to stream the video to the container as the video stream; initiating a data session with the requestor; and providing the video stream from the container to the requestor.

In some embodiments, the inquiry message can include data that reflects the parameter. In some embodiments, the inquiry message can include a message whose address is specified using a description of allowed spatial locations of recipients. In some embodiments, the parameter can be selected from a group of parameters that includes one, more than one, or all of data that can identify a user; data that can identify a vehicle; data that can identify a mobile computing node; data that can identify a filter; data that can identify a requirement; and data that can identify a geographic location. In some embodiments, providing the list can include providing data that, when rendered by the requestor, corresponds to a user interface that can include a map display of an area and representations of the mobile computing nodes.

According to another aspect of the concepts and technologies disclosed herein, a method is disclosed. The method can include receiving, from a requestor and at a computer including a processor that executes a controller, a request for streaming video captured by a mobile computing node of two or more mobile computing nodes. The request can include a parameter associated with the streaming video. The method also can include initiating, by the computer, transmission of an inquiry message to the two or more mobile computing nodes; receiving, at the computer, inquiry message responses from mobile computing nodes including the mobile computing node. The inquiry message responses can indicate that the mobile computing nodes can satisfy the parameter. The method also can include creating, by the computer, a list of the mobile computing nodes; providing, by the computer, the list of the mobile computing nodes to the requestor; receiving, by the computer and from the requestor, a selection of the mobile computing node, and initiating, by the computer, delivery of a video stream to the requestor. The video stream can be obtained from the mobile computing node.

In some embodiments, the two or more mobile computing nodes can be inactive before the transmission of the inquiry message and the two or more mobile computing nodes can wake in response to receiving the inquiry message. In some embodiments, initiating delivery of the video stream can include: creating a container for the video stream; instructing the mobile computing node to stream the video to the container as the video stream; initiating a data session with the requestor; and providing the video stream from the container to the requestor. In some embodiments, the inquiry message can include a message whose address is specified using a description of allowed spatial locations of recipients.

According to yet another aspect of the concepts and technologies disclosed herein, a computer storage medium is disclosed. The computer storage medium can store computer-executable instructions that, when executed by a processor, cause the processor to perform operations. The operations can include receiving, from a requestor, a request for streaming video captured by a mobile computing node of two or more mobile computing nodes. The request can include a parameter associated with the streaming video. The operations also can include initiating transmission of an inquiry message to the two or more mobile computing nodes and receiving inquiry message responses from mobile computing nodes including the mobile computing node. The inquiry message responses can indicate that the mobile computing nodes can satisfy the parameter. The operations also can include creating a list of the mobile computing nodes, providing the list of the mobile computing nodes to the requestor, receiving, from the requestor, a selection of the mobile computing node, and initiating delivery of a video stream to the requestor. The video stream can be obtained from the mobile computing node.

In some embodiments, the two or more mobile computing nodes can be inactive before the transmission of the inquiry message and the two or more mobile computing nodes can wake in response to receiving the inquiry message. In some embodiments, initiating delivery of the video stream can include: creating a container for the video stream; instructing the mobile computing node to stream the video to the container as the video stream; initiating a data session with the requestor; and providing the video stream from the container to the requestor. In some embodiments, the inquiry message can include data that reflects the parameter.

In some embodiments, initiating the transmission of the inquiry message can include sending an instruction to a node of a network. The instruction can instruct the node to transmit the inquiry message to the mobile computing node. In some embodiments, the parameter can be selected from a group of parameters that can include data that can identify a user; data that can identify a vehicle; data that can identify a mobile computing node; data that can identify a filter; data that can identify a requirement; and data that can identify a geographic location. In some embodiments, providing the list can include providing data that, when rendered by the requestor, corresponds to a user interface that can include a map display of an area and representations of the mobile computing nodes.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
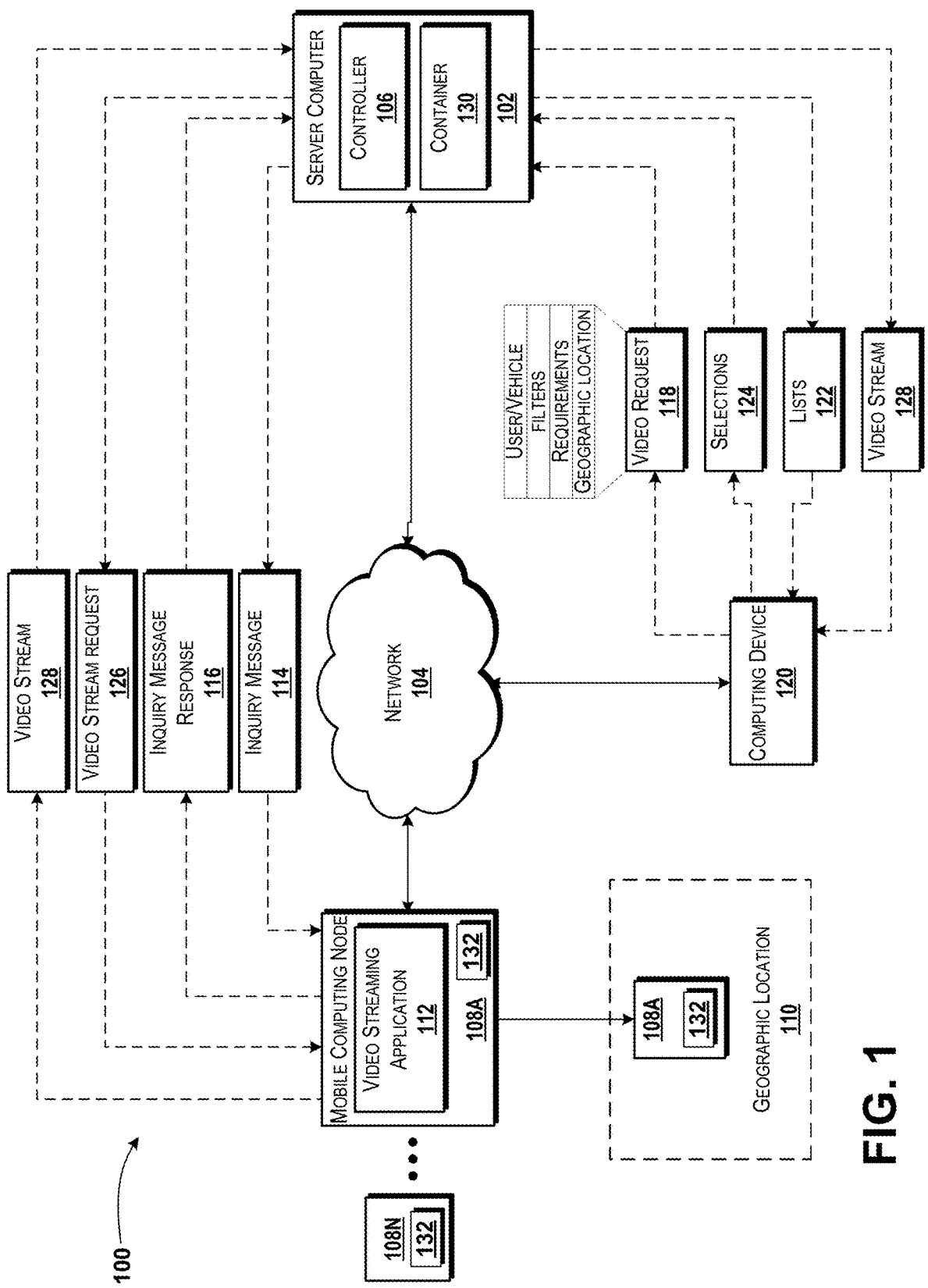
FIG. 1 is a system diagram illustrating an illustrative operating environment for various embodiments of the concepts and technologies described herein.

The following detailed description is directed to providing streaming video from mobile computing nodes. A user, application, device, or other entity can request images, video, or other content by way of creating and/or submitting a request to a controller or other module, application, program, service, or the like executed or hosted by a server computer. According to various embodiments, the requested content is a live video stream, and the request includes a video request. The video request can include various parameters such as, for example, data that specifies a particular user, a particular vehicle, a particular mobile computing node, or other particular entity; one or more filters such as bearing, location, orientation, or the like; one or more requirements such as resolution, image quality, frame rate, compression format, file format, or the like; geographic location; other considerations; combinations thereof; or the like. The parameters can be used to limit the pool of mobile computing nodes that will be considered as candidates to provide the requested video. The server computer can analyze the video request and identify, based on the analysis, the various requirements associated with the requested video.

The server computer can create and send an inquiry message that can include the parameters or data that encompasses the parameters. The server computer can transmit or initiate transmission of the inquiry message to one or more mobile computing nodes. In some embodiments, the server computer instructs one or more nodes of a wireless network to communicate the inquiry message to one or more of the mobile compute nodes. The inquiry message can be broadcast, multicast, or otherwise transmitted to the mobile computing nodes. The mobile computing nodes can be inactive when the inquiry message is received and woken by the inquiry message, in some embodiments. The mobile computing nodes can be configured to determine whether or not the mobile computing node satisfies the one or more parameters included in/with or reflected by the inquiry message. The mobile computing nodes can respond with an indication of whether or not the mobile computing node can provide video that complies with the requirements and/or other parameters, for example, using an inquiry message response.

The server computer can receive the inquiry message response(s) and create a list. The list can represent each mobile computing node that can satisfy the video request and/or the requirements or other parameters specified with the video request. The list can be provided to and presented by the computing device. A user or other entity associated with the computing device can select a mobile computing node from the list, and data that indicates the selection can be provided to the server computer. The server computer can send a video stream request to the selected mobile computing node. The mobile computing node can initiate a data session with the server computer and begin streaming the content, for example as the video stream. The server computer can create a container before, during, or after sending the video stream request. The video stream can be streamed to the container. The server computer can create a data session with the computing device, and the server computer can stream the video stream from the container to the computing device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing streaming video from mobile computing nodes will be described, according to an illustrative embodiment. The operating environment 100 shown in FIG. 1 includes a server computer 102. The server computer 102 can operate in communication with and/or as part of a communications network ("network") 104, though this is not necessarily the case.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a web server, an application server, or other server computer. It should be understood that this embodiment is illustrative, and should not be construed as being limiting in any way.

The server computer 102 can execute an operating system (not labeled in FIG. 1) and one or more application programs such as, for example, a controller module, application, or service ("controller") 106. The operating system can include a computer program for controlling the operation of the server computer 102. The controller 106 can include an executable program that can be configured to execute on top of the operating system to provide various functions as illustrated and described herein.

For example, the controller 106 can be configured to communicate with one or more mobile computing nodes 108A-N (hereinafter collectively and/or generically referred to as "mobile computing nodes 108"). The mobile computing nodes 108 can correspond to compute elements of a cloud computing environment that is provided by the server computer 102 (via execution of the controller 106), the network 104, and the mobile computing nodes 108, as will be illustrated and described in more detail below. The mobile computing nodes 108 can be provided by hardware and software that can move to, from, among, through, and/or about various geographic locations such as the geographic location 110 shown in FIG. 1.

According to various embodiments, the controller 106 can be configured to control connectivity of the mobile computing nodes 108 or some aspects, at least, of communications by the mobile computing nodes 108. In particular, the controller 106 (and/or the server computer 102 that hosts or executes the controller 106) can operate in conjunction with the mobile computing nodes 108 to provide a cloud computing network. The controller 106 can selectively activate the mobile computing nodes 108 as will be explained in more detail hereinbelow. In some instances, the mobile computing nodes 108 can be woken and/or activated based on capabilities, geographic location, or other considerations. In one particular embodiment, the controller 106 can use location-based focus of attention. Various technologies for providing location-based focus of attention, location-based situational awareness subsystems, geocast primitives, OpenStack extension subsystems, Nova APIs, and the like, are illustrated and described in more detail in U.S. patent application Ser. No. 15/432,042, filed on Feb. 14, 2017, which is incorporated herein by reference in its entirety for purposes of providing details of the various hardware and software components of the operating environment 100. It should be understood that this example is illustrative, and therefore should not be construed as being limiting in any way.

The mobile computing nodes 108 can be configured to execute a video streaming application 112. The video streaming application 112 can be configured to perform the functionality illustrated and described herein for providing streaming video from the mobile computing nodes 108. According to various embodiments, the video streaming application 112 can be configured to recognize data received at the mobile computing node 108 as an inquiry message 114. The inquiry message 114 can be broadcast to the mobile computing nodes 108 via a control channel, a broadcast channel, a peer-to-peer data communication, or other session, station, channel, or the like. According to various embodiments, the inquiry message 114 can include data that indicates one or more of an identity (of a user or other entity, a mobile computing node 108, or a person or entity associated with the mobile computing node 108); a filter (as will be explained in more detail below); requirements; geographic locations; or the like associated with a requested video stream.

In some embodiments, the inquiry message 114 can be addressed to one or more of the mobile computing nodes 108 by way of data, included in the inquiry message 114, where the data defines an address for the inquiry message 114. In some embodiments, the address can be specified using a description of allowed spatial locations (e.g., geographic locations) of recipients, and as such only mobile computing nodes 108 at those spatial locations may receive the inquiry message 114. Thus, in some embodiments, the inquiry message 114 can include data that defines boundaries of a geographic location or region, and any mobile computing nodes 108 within that geographic location or region may receive the inquiry message 114 (and mobile computing nodes 108 outside of the geographic location or region may not receive the inquiry message 114. Thus, sending of the inquiry message 114 can include querying locations of mobile computing nodes 108 (from the mobile computing nodes 108, from a location server, or other device(s)) and sending the inquiry message 114 to mobile computing nodes 108 within the defined geographic location or region. It should be understood that this example is illustrative, and therefore should not be construed as being limiting in any way. The inquiry message 114 can be used for several purposes.

First, the inquiry message 114 can be used to wake the mobile computing nodes 108. In particular, the mobile computing nodes 108 can be configured to not operate as part of the cloud computing environment when not in use. Thus, the inquiry message 114 can be used to wake the mobile computing nodes 108, whereby the mobile computing nodes 108 begin (or resume) operations as the mobile computing nodes 108 of the cloud environment. It should be understood that this example is illustrative, and therefore should not be construed as being limiting in any way.

The inquiry message 114 also can be used to communicate identity information, filters, requirements, locations, or the like to the mobile computing nodes 108. The mobile computing nodes 108 can be configured, via execution of the video streaming application 112, to determine if the requirements, filters, identity information, and/or location specified in the inquiry message 114 can be satisfied by streaming video captured by a capture device associated with the mobile computing node 108. Additional details of the inquiry message 114 will be discussed in more detail below.

The mobile computing node 108 can generate and send an inquiry message response 116. The inquiry message response 116 can indicate that the mobile computing node 108 is capable of satisfying the various requirements, filters, locations, identity information, or the like as specified in the inquiry message 114. Thus, the inquiry message response 116 can be used to indicate that the mobile computing node 108 can provide a requested stream of video as will be explained in more detail below. When the mobile computing nodes 108 receive the inquiry message 114, the mobile computing nodes 108 can wake themselves, determine if they can provide streaming video that satisfies any parameters specified in the inquiry message 114, and send an inquiry message response 116 that indicates whether or not the mobile computing node 108 that sent the response can provide streaming video that satisfies the parameters specified in the inquiry message 114. It should be understood that this example is illustrative, and therefore should not be construed as being limiting in any way.

The server computer 102 can receive the inquiry message response 116. The mobile computing node 108 can create the inquiry message response 116 with other information such as, for example, an indication of a current location, an indication of a current bearing, an indication of a current orientation, data transfer capabilities, image capture capabilities, image compression capabilities, combinations thereof, or the like. Based on the inquiry message response 116, and other inquiry message responses 116 received by the server computer 102, the server computer 102 can determine one or more mobile computing nodes 108 that can satisfy the various parameters of the inquiry message 114. The parameters added to and/or reflected by the inquiry message 114 can be based on one or more parameters included in a request for streaming video ("video request") 118. The video request 118 can be created and/or submitted to the server computer 102 by various devices such as, for example, a computing device 120.

The video request 118 can include a request for streaming video from a particular geographic location, from a particular mobile computing node 108, from a particular user or other entity associated with a particular mobile computing node 108, or the like. The video request 118 also can specify one or more aspects of the requested video such as, for example, a resolution, a frame rate, a compression format, or the like. Thus, the video request 118 can include various requirements that can specify these and other aspects of the requested video, timing requirements (e.g., delivery time) for the video that is being requested, bandwidth requirements and/or limitations for delivery of the video that is being requested, combinations thereof, or the like. The video request 118 also can include one or more filters that can be used to add other requirements such as, for example, a location, orientation, heading, or the like of a mobile computing node 108; specific devices or formats for the video; or the like. Thus, the video request 118 can include various requirements, filters, location definitions, user definitions, vehicle or other mobile computing node identifiers, combinations thereof, or the like; and these and other aspects can be used by the server computer 102 to generate one or more parameters that are added to the inquiry message 114. It should be understood that this example is illustrative, and therefore should not be construed as being limiting in any way.

The server computer 102 can determine, based on the one or more inquiry message responses 116, which mobile computing nodes 108 can satisfy the video request 118. The server computer 102 can generate one or more list 122. The list 122 can identify each of the capable mobile computing nodes 108. The list 122 can be transmitted to the computing device 120 that generated the video request 118, in some embodiments. In various embodiments, the list 122 can be generated as a map view that shows relative locations, on the map, of the mobile computing nodes 108, other information, and the like. In some other embodiments, the list 122 can include other types of displays for presenting the one or more mobile computing node 108 that can satisfy the various aspects of the video request 118. It should be understood that this example is illustrative, and therefore should not be construed as being limiting in any way.

A user, other entity, application, or the like at the computing device 120 can review the list 122 and make one or more selections 124. The one or more selections 124 can include data that indicates a selected mobile computing node 108. Thus, for example, if a list 122 includes data that represents a first mobile computing node 108A and the user or other entity inputs a command (e.g., a tap, click, selection, or the like) to indicate a desire to see streaming video associated with the mobile computing node 108A, the selection 124 can indicate this choice. The selection 124 can be provided to the server computer 102 by the computing device 120, in some embodiments. In some other embodiments, the computing device 120 can access a portal, web page, or the like, to view the list 122 and/or to input selections 124. Thus, the selections 124 may or may not be transmitted as shown in the illustrated embodiment of FIG. 1. Thus, the illustrated embodiment is illustrative and should not be construed as being limiting in any way.

The server computer 102 can receive the selections 124 and identify, based on the selections 124, a mobile computing node 108 from which streamed video is to be obtained. The server computer 102 can generate a video stream request 126 and send the video stream request 126 to the mobile computing node 108 that was identified. It should be understood that although the video stream request 126 is referred to as a "request," that the video stream request 126 can correspond to a command, in some embodiments. Thus, the server computer 102 can command the mobile computing node 108 to stream video, in some embodiments, by way of generating and/or providing the video stream request 126 to the mobile computing node 108.

The mobile computing node 108 can be configured to begin streaming video in response to the video stream request 126. In particular, the mobile computing node 108 can generate a video stream 128, which can include a data stream of video images, as generally is known. According to various embodiments, the server computer 102 can create a container 130 and can instruct (or request) the mobile computing node 108 to stream the video (e.g., by way of the video stream 128) to the container 130. It should be understood that this example is illustrative, and therefore should not be construed as being limiting in any way.

The server computer 102 can also be configured to set up a data session between the computing device 120 and the server computer 102 for purposes of providing the requested video to the computing device 120. In some embodiments, the server computer 102 can create a data session and transmit the video stream 128 from the container 130 to the computing device 120. Thus, it can be appreciated that the server computer 102 can provide the video stream 128 to the computing device 120, and that the mobile computing node 108 can stream the video to the server computer 102 by way of the video stream 128. Thus, it can be appreciated that the mobile computing node 108 can be configured to stream the video to the computing device 120 through an intermediary, namely, the server computer 102, and not via a peer-to-peer data session between the mobile computing node 108 and the computing device 120. It should be understood that this example is illustrative, and therefore should not be construed as being limiting in any way.

In practice, a user, application, device, or other entity can request images, video, or other content (the example of video is used for purposes of illustration) by way of creating and/or submitting a video request 118 to a controller 106 (or the server computer 102 that executes the controller 106). The video request 118 can include various parameters such as, for example, data that specifies a particular user, a particular vehicle, a particular mobile computing node 108, or other particular entity; one or more filters such as bearing, location, orientation, or the like; one or more requirements such as resolution, image quality, frame rate, compression format, file format, or the like; geographic location; other considerations; combinations thereof; or the like. The parameters can be used to limit the pool of mobile computing nodes 108 that will be considered as candidates to provide the requested video. The controller 106 can analyze the video request 118 and identify, based on the analysis, the various requirements associated with the requested video.

The controller 106 can create an inquiry message 114. The inquiry message 114 can include the parameters or data that encompasses the parameters. The controller 106 or the server computer 102 can transmit or initiate transmission of the inquiry message 114 to one or more mobile computing nodes 108. The inquiry message 114 can be broadcast to the mobile computing nodes 108 (e.g., the inquiry message can be broadcast over a control channel to the mobile computing nodes 108), multicast to the mobile computing nodes 108, or otherwise transmitted to the mobile computing nodes 108 (e.g., through a peer-to-peer data session, or the like).

According to various embodiments of the concepts and technologies disclosed herein, the mobile computing nodes 108 can be inactive when the inquiry message 114 is received. In other words, the mobile computing nodes 108 can be inactive in terms of connectivity with the server computer 102 and/or the controller 106, but can receive the inquiry message 114 and be "woken" by recognizing the inquiry message 114. The mobile computing nodes 108 can also be configured, via execution of a video streaming application 112, to determine whether or not the mobile computing node 108 satisfies the one or more parameters included in/with or reflected by the inquiry message 114. The mobile computing nodes 108 can respond with an indication of whether or not the mobile computing node 108 can provide video that complies with the requirements and/or other parameters, for example, using an inquiry message response 116.

The inquiry message response 116 can include data that indicates a current location associated with the mobile computing node 108; a bearing of the mobile computing node 108; an orientation of the mobile computing node 108; a latency, speed, bandwidth, etc., associated with a data connection of the mobile computing node 108; capabilities (e.g., resolution, frame capture rate; or the like) of a capture device associated with the mobile computing node 108; a user identity associated with the mobile computing node 108; and/or other types of information.

The controller 106 can receive the inquiry message response(s) 116 (e.g., via hardware associated with the server computer 102) and create a list 122. The list 122 can represent each mobile computing node 108 that can satisfy the video request 118 and/or the requirements or other parameters specified with the video request 118. The list 122 can include an actual list of devices, or a visual display such as a map display (an example of which is illustrated and described below with reference to FIGS. 5B-5C). The list 122 can be provided to and presented by the computing device 120. A user or other entity associated with the computing device 120 can select a mobile computing node 108 from the list 122, and data that indicates the selection can be provided to the controller 106.

The controller 106 can send a video stream request 126 to the selected mobile computing node 108. The video stream request 126 can include a request that the mobile computing node 108 initiate streaming of video from an associated capture device (e.g., a video camera or other imaging device 132) and specifications/requirements for the content. It can be appreciated that the specifications/requirements can be similar or even identical to the parameters previously received by the mobile computing node 108. In some embodiments, the video stream request 126 can include a command to initiate streaming, as noted above. The mobile computing node 108 can open a data session with the server computer 102 and begin streaming the content, for example as the video stream 128.

The server computer 102 can create a container 130 before, during, or after sending the video stream request 126. The video stream 128 can be streamed to the container 130. The server computer 102 can create a data session with the computing device 120, and the server computer 102 can stream the video stream 128 from the container 130 to the computing device 120. Thus, the computing device 120 can receive the video stream 128, and the video stream 128 can satisfy the various requirements associated with the video request 118. These and other aspects of the concepts and technologies disclosed herein will be illustrated and described below.

FIG. 1 illustrates one server computer 102, one network 104, two mobile computing nodes 108, one geographic location 110, and one computing device 120. It should be understood, however, that various implementations of the operating environment 100 can include zero, one, or more than one server computer 102; zero, one, or more than one network 104; zero, one, two, or more than two mobile computing nodes 108; zero, one, or more than one geographic location; and/or zero, one, or more than one computing device 120. As such, the illustrated embodiment should be understood as being illustrative, and should not be construed as being limiting in any way.

Figure 2:
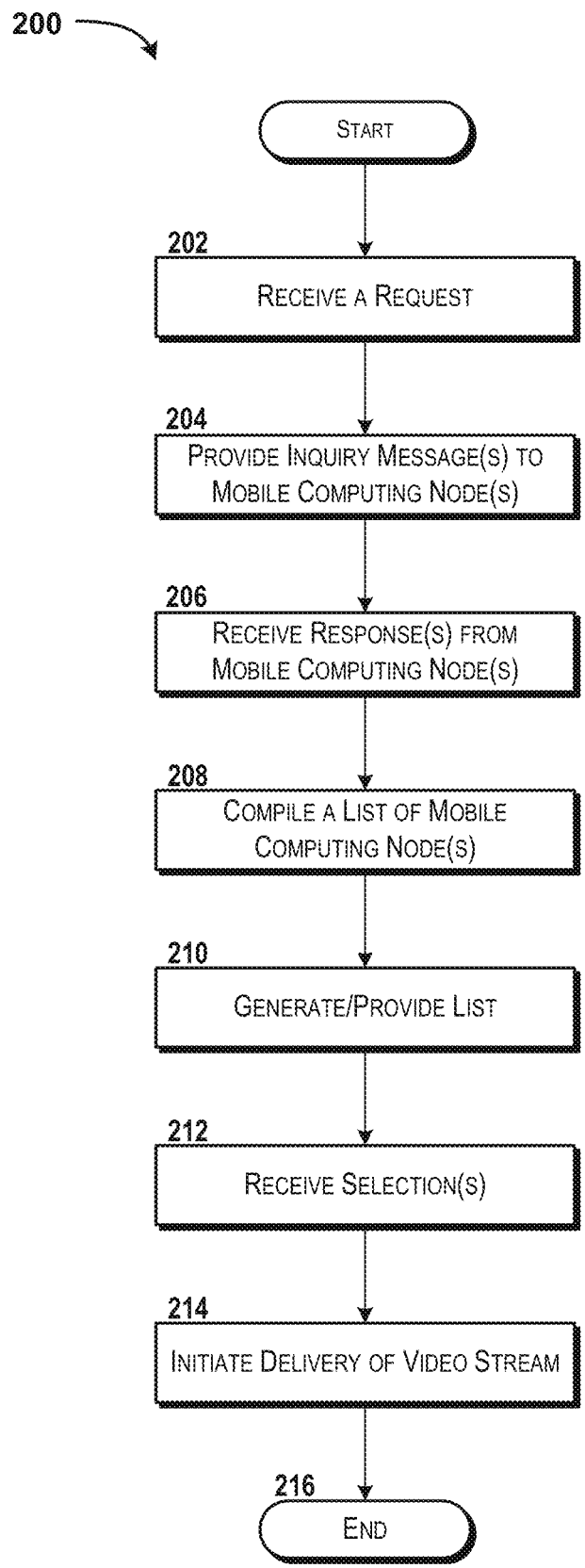
FIG. 2 is a flow diagram showing aspects of a method for providing streaming data from mobile computing nodes, according to an illustrative embodiment of the concepts and technologies described herein.

Turning now to FIG. 2, aspects of a method 200 for providing streaming data from mobile computing nodes will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules, applications, services, or the like such as, for example, the controller 106. It should be understood that additional and/or alternative devices and/or network nodes can provide the functionality described herein via execution of one or more modules, applications, and/or other software including, but not limited to, the controller 106. Thus, the illustrated embodiments are illustrative, and should not be viewed as being limiting in any way.

The method 200 begins at operation 202. At operation 202, the server computer 102 can receive a request for images, video, or the like. In some embodiments, for example, the server computer 102 can receive a video request 118. As explained above with reference to FIG. 1 with reference to the video request 118, the request received in operation 202 can include data that specifies one or more user, vehicle, or other entity; one or more filters; one or more requirements; one or more geographic locations; and/or other parameters or the like associated with the video or images that are being requested by way of the request received in operation 202. Thus, for example, the request received in operation 202 can specific a particular user, a particular location, a particular vehicle, or the like. It should be understood that this example is illustrative, and therefore should not be construed as being limiting in any way.

From operation 202, the method 200 can proceed to operation 204. At operation 204, the server computer 102 can, based on the request received in operation 202, initiate one or more inquiry messages 114 to one or more mobile computing nodes 108. As explained above in detail, the inquiry message 114 can specify or otherwise indicate the one or more parameters specified by way of the request received in operation 202. Thus, the server computer 102 can effectively query one or more mobile computing nodes 108 in operation 204 to identify one or more mobile computing nodes 108 that can satisfy the requirements and/or preferences specified in the request receive in operation 202.

In some embodiments, the inquiry message 114 can be broadcast to the mobile computing nodes 108. For example, the server computer 102 can instruct a component of the server computer 102 or other node of the network 104 to broadcast the inquiry message 114 over a particular channel. In some embodiments, for example, the inquiry message 114 can be sent over a control channel, a voice channel, or the like. In some other embodiments, the inquiry message 114 can be multicast to two or more mobile computing nodes 108. In yet other embodiments, the inquiry message 114 can be transmitted to each of the mobile computing nodes 108 (or a selected subset of the mobile computing nodes 108) via one or more data sessions (e.g., a peer-to-peer data session, or the like). Because the inquiry message 114 can be provided to the mobile computing nodes 108 in additional and/or alternative ways, it should be understood that these examples are illustrative, and therefore should not be construed as being limiting in any way.

From operation 204, the method 200 can proceed to operation 206. At operation 206, the server computer 102 can receive one or more responses from the one or more mobile computing nodes 108 to which the inquiry messages 114 were sent in operation 204. It can be appreciated that the response(s) received in operation 206 can include the inquiry message responses 116 illustrated and described with reference to FIG. 1. Thus, the response(s) received in operation 206 can indicate whether or not the associated mobile computing node 108 can satisfy the various requirements, filters, or other parameters associated with the request received in operation 202, but also information that relates to the mobile computing node 108 such as, for example, a location of the mobile computing node 108, a heading of the mobile computing node 108, a bearing and orientation of the mobile computing node 108, a speed of movement associated with the mobile computing node 108, data transmission capabilities associated with the mobile computing node 108, image and/or audio capture capabilities of the mobile computing node 108, combinations thereof, or the like.

From operation 206, the method 200 can proceed to operation 208. At operation 208, the server computer 102 can analyze the responses received in operation 204 and generate a list of mobile computing nodes 108 such as the list 122 illustrated and described above with reference to FIG. 1. Thus, it can be appreciated that the server computer 102 can determine, based on the responses received in operation 206, which mobile computing nodes 108 are capable of providing video or images in accordance with the various parameters, requirements, filters, etc. specified in the request received in operation 202.

From operation 208, the method 200 can proceed to operation 210. At operation 210, the server computer 102 can generate and provide a map display to the requestor that created the request received in operation 202. In some embodiments, the server computer 102 can generate display data that can be displayed by the requestor (e.g., the computing device 120 shown in FIG. 1) to provide a map display. In some other embodiments, the server computer 102 can provide data that can be used by the computing device 120 to generate a map display. In either case, the server computer 102 can, in operation 210, generate data that is used (or displayed) to provide a map display. This data can be included in the lists 122 that the server computer 102 can provide to the requestor. Thus, it can be appreciated that the one or more lists 122 can include data that identifies one or more mobile computing nodes 108 and/or data that can be rendered to provide a map display showing the one or more mobile computing nodes 108.

From operation 210, the method 200 can proceed to operation 212. At operation 212, the server computer 102 can receive a selection 124. The selection 124 can correspond to a choice of a mobile computing node 108 from the list 122 and/or the map display. Additional details of the map display and/or the list 122 are illustrated and described below with reference to FIGS. 5A-5C. Briefly, however, it should be noted that a user or other entity associated with the requestor can select a mobile computing node 108 from the list 122 and/or the map display, and data that corresponds to the selected mobile computing node 108 can be received by the server computer 102 in operation 212 as the selection 124.

From operation 212, the method 200 can proceed to operation 214. At operation 214, the server computer 102 can initiate delivery of a video stream such as the video stream 128. It should be understood that other types of content can be requested and/or delivered such as, for example, images, audio, or the like. Thus, the example of streaming video should be understood as being illustrative and should not be construed as being limiting in any way.

To initiate delivery of the video stream 128, the server computer 102 can be configured to create a container such as the container 130 illustrated and described with reference to FIG. 1, and to send a video stream request 126 to the mobile computing node 108 that was selected. The server computer 102 also can receive the video stream 128 from the mobile computing node 108 and add the video stream 128 to the container 130. The server computer 102 also can initiate a streaming session between the server computer 102 and the computing device 120 or other device that requested the video stream 128. Thus, the server computer 102 can receive the video stream 128 and provide the video stream 128 to another entity such as the requestor and/or a device associated with the requestor such as the computing device 120. It should be understood that this example is illustrative, and therefore should not be construed as being limiting in any way.

From operation 214, the method 200 can proceed to operation 216. The method 200 can end at operation 216.

Figure 3:
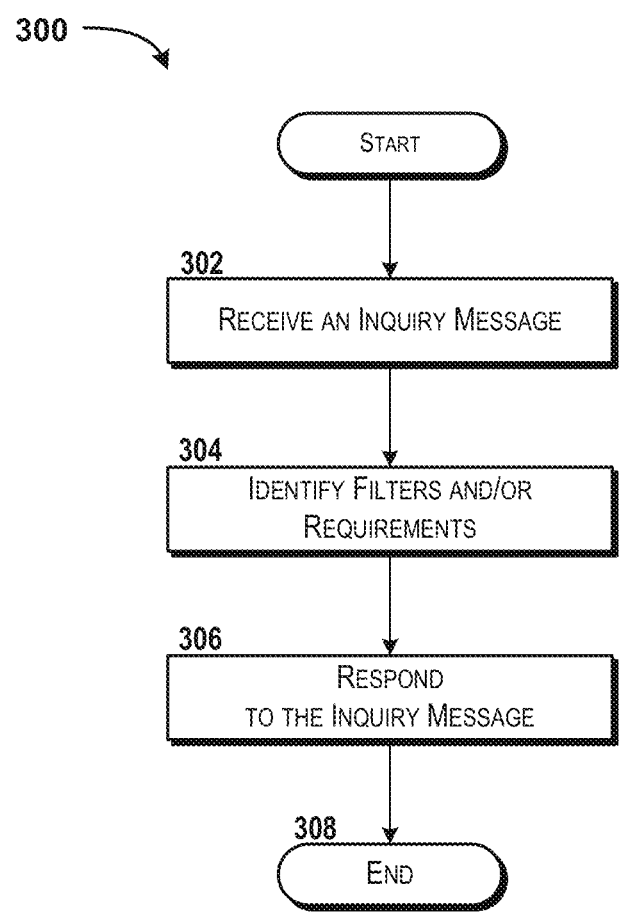
FIG. 3 is a flow diagram showing aspects of a method for requesting streaming data from a mobile computing node, according to an illustrative embodiment of the concepts and technologies described herein.

Turning now to FIG. 3, aspects of a method 300 for requesting streaming data from a mobile computing node will be described in detail, according to an illustrative embodiment. For purposes of illustrating and describing the concepts of the present disclosure, the method 300 is described herein as being performed by the mobile computing node 108 via execution of one or more software modules such as, for example, the video streaming application 112. It should be understood that additional and/or alternative devices and/or network nodes can provide the functionality described herein via execution of one or more modules, applications, and/or other software including, but not limited to, the video streaming application 112. Thus, the illustrated embodiments are illustrative, and should not be viewed as being limiting in any way.

The method 300 begins at operation 302. At operation 302, the mobile computing node 108 can receive an inquiry message such as the inquiry message 114. It can be appreciated that the inquiry message received by the mobile computing node 108 in operation 302 can be similar or even identical to the inquiry message sent in operation 204 of the method 200 illustrated in FIG. 2. It should be understood that this example is illustrative, and therefore should not be construed as being limiting in any way.

The inquiry message 114 received in operation 302 can include one or more parameters. As explained herein, the one or more parameters can specify a particular user, vehicle, mobile computing node 108, or other entity; one or more filters such as a heading, a direction of travel, an orientation and/or viewing direction, or the like; one or more requirements such as a video or image resolution, a bandwidth requirement, a data transfer rate, an audio sampling rate, or the like; a geographic location; other parameters; or the like. As explained above, the various parameters can be included with or as a part of the inquiry message 114 received in operation 302 and can be used by the mobile computing nodes 108 to determine whether or not the mobile computing nodes 108 can provide the requested content (e.g., video, images, or the like). As noted above, the inquiry message 114 can be broadcast to the mobile computing nodes 108 (e.g., the inquiry message can be broadcast over a control channel to the mobile computing nodes 108), multicast to the mobile computing nodes 108, or otherwise transmitted to the mobile computing nodes 108 (e.g., through a peer-to-peer data session, or the like).

From operation 302, the method 300 can proceed to operation 304. At operation 304, the mobile computing node 108 can identify one or more filters or requirements. In particular, the mobile computing node 108 can analyze the inquiry message 114 received in operation 302 and determine, based on the analysis, one or more parameters such as filters, requirements, or the like. Thus, in operation 304 the mobile computing node 108 can identify these parameters and the associated filters and/or requirements.

From operation 304, the method 300 can proceed to operation 306. At operation 306, the mobile computing node 108 can send a response to the inquiry message received in operation 302. Thus, in operation 306, the mobile computing node 108 can send an inquiry message response 116. The inquiry message response 116 sent in operation 306 can indicate, to a recipient such as the server computer 102, either a) that the mobile computing node 108 is capable of providing images, video, or other content that complies with the various parameters included in or with the inquiry message 114 received in operation 302; or b) that the mobile computing node 108 is incapable of providing images, video, or other content that complies with the various parameters included in or with the inquiry message 114 received in operation 302. The mobile computing node 108 can generate and send the inquiry message response 116 to the server computer 102.

From operation 306, the method 300 can proceed to operation 308. The method 300 can end at operation 308.

Figure 4:
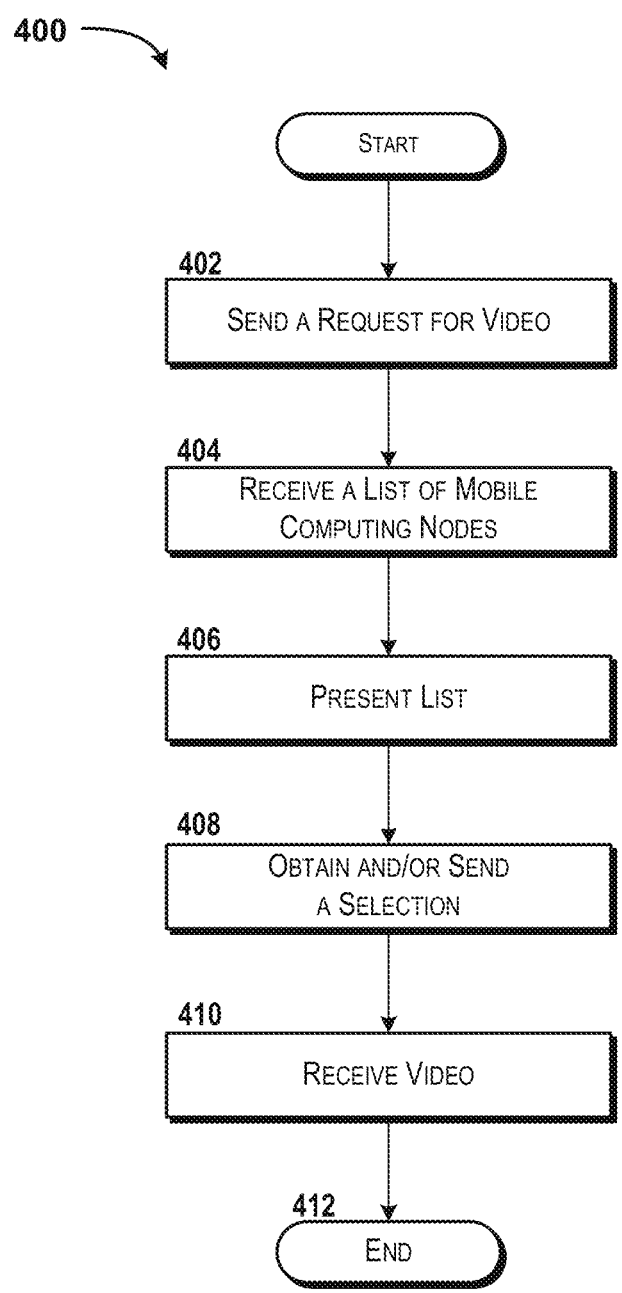
FIG. 4 is a flow diagram showing aspects of a method for streaming data from a mobile computing node, according to an illustrative embodiment of the concepts and technologies described herein.

Turning now to FIG. 4, aspects of a method 400 for streaming data from a mobile computing node 108 will be described in detail, according to an illustrative embodiment. For purposes of illustrating and describing the concepts of the present disclosure, the method 400 is described herein as being performed by the computing device 120 via execution of one or more software modules such as, for example, a standalone application, a web browser, or the like. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins at operation 402. At operation 402, the computing device 120 can send a request for video.

In some embodiments, the request sent in operation 402 can be sent to the server computer 102, though this is not necessarily the case. The request sent in operation 402 can be similar or even identical to the video request 118 illustrated and described above with reference to FIG. 1. Thus, it can be appreciated that the request sent in operation 402 can include, for example, data that identifies one or more users, vehicles, mobile computing nodes 108, or other entities; one or more filters; one or more requirements; one or more geographic locations; combinations thereof; or the like. It also can be appreciated that the request sent in operation 402 can be similar or even identical to the request received by the server computer 102 in operation 202 of the method 200 illustrated in FIG. 2. It should be understood that this example is illustrative, and therefore should not be construed as being limiting in any way.

From operation 402, the method 400 can proceed to operation 404. At operation 404, the computing device 120 can receive a list of mobile computing nodes 108 such as, for example, the list 122 illustrated and described herein with reference to FIG. 1. In some embodiments, the list received in operation 404 can be received from the server computer 102, though this is not necessarily the case.

From operation 404, the method 400 can proceed to operation 406. At operation 406, the computing device 120 can present the list 122 received in operation 404. As explained above, the list 122 received in operation 404 can include data that specifies one or more mobile computing nodes 108. In some other embodiments, the list 122 received in operation 404 can include a map display that shows the available mobile computing nodes 108 (that satisfy the requirements associated with the request).

Thus, in some embodiments, operation 406 can correspond to the computing device 120 presenting a user interface via which a user or other entity can select one of multiple available mobile computing nodes 108. Some example UIs for presenting the list 122 are illustrated and described below with reference to FIGS. 5A-5D. It should be understood that this example is illustrative, and therefore should not be construed as being limiting in any way.

From operation 406, the method 400 can proceed to operation 408. At operation 408, the computing device 120 can obtain and send a selection such as the selection 124. The selection 124 obtained and/or provided in operation 406 can indicate a mobile computing node 108, from the list 122 of mobile computing nodes 108, that the requestor wants to obtain content (e.g., streaming video) from. Also, it should be understood that a user or other entity may specify more than one mobile computing node 108, e.g., a backup mobile computing node 108 can be selected in case a first or primary mobile computing node 108 becomes unavailable, moves out of a specified location, loses connectivity, or the like. It should be understood that multiple selections 124 may be provided, in some embodiments.

From operation 408, the method 400 can proceed to operation 410. At operation 410, the computing device 120 can receive video such as, for example, the video stream 128 illustrated and described above with reference to FIG. 1. In some embodiments, as explained above, the video stream 128 can be provided by the mobile computing node 108 to the server computer 102, the server computer 102 can stream the video stream 128 into a container, and the server computer 102 can then enable a data session between the server computer 102 and the computing device 120. Thus, the computing device 120 can obtain the video stream 128 from the server computer 102 and not directly from the mobile computing node 108, according to various embodiments of the concepts and technologies disclosed herein. It should be understood that this example is illustrative, and therefore should not be construed as being limiting in any way.

From operation 410, the method 400 can proceed to operation 412. The method 400 can end at operation 412.

Figure 5A:
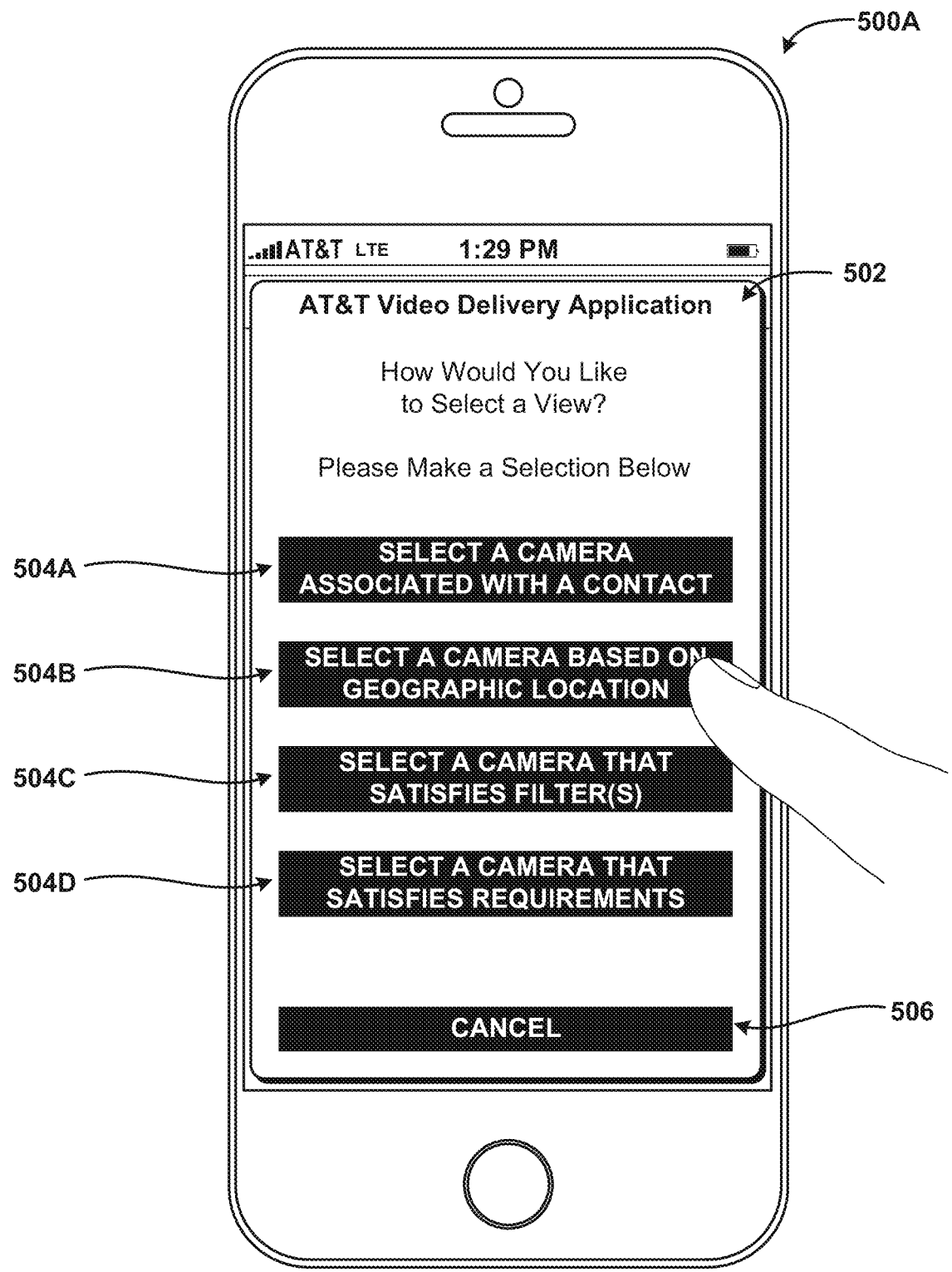
FIGS. 5A-5D are user interface diagrams showing various screen displays for requesting and viewing streaming video from mobile computing nodes, according to some illustrative embodiments of the concepts and technologies described herein.

FIGS. 5A-5D are user interface ("UI") diagrams showing aspects of UIs for requesting, obtaining, and/or using streaming video from a mobile computing node 108, according to some illustrative embodiments. FIG. 5A shows an illustrative screen display 500A. According to some embodiments of the concepts and technologies described herein, the screen display 500A can be generated by a device such as the computing device 120 via interactions with the controller 106 and/or other modules, applications, services, or nodes of the server computer 102, or by a local application that can be executed by the computing device 120. In particular, according to various embodiments, the computing device 120 can generate the screen display 500A and/or other screen displays in response to detecting activation of a video stream application or via execution of other applications, modules, routines, or the like. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, when an option to access streaming video or other content is selected at the computing device 120. In some contemplated embodiments, an application for obtaining streaming video can be activated at the computing device 120, and the UI illustrated in FIG. 5A can be presented in response to activation of the application. It should be understood that this example is illustrative, and therefore should not be construed as being limiting in any way. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include a selection mode window 502. The selection mode window 502 can be configured to enable a user or other entity to specify a manner in which the user or other entity will specify which mobile computing node(s) 108 will be considered for streaming the video being requested. As explained above, the mobile computing nodes 108 can be selected based on location, bearing, orientation, an associated user, capabilities, requirements, filters, and/or other considerations. As such, it should be understood that the illustrated embodiment is illustrative of some considerations that can be used to search for mobile computing nodes 108 and that other considerations are possible and are contemplated. As such, the illustrated embodiment is illustrative and should not be construed as being limiting in any way.

The selection mode window 502 can include one or more node selection criteria selectors 504A-D (hereinafter collectively and/or generically referred to as "node selection criteria selectors 504"). Selection of the node selection criteria selector 504A can cause the computing device 120 to communicate to the controller 106 that mobile computing nodes 108 are to be identified based on the identity of an associated user. Selection of the node selection criteria selector 504B can cause the computing device 120 to communicate to the controller 106 that mobile computing nodes 108 are to be identified based on the geographic location of the mobile computing nodes 108. Selection of the node selection criteria selector 504C can cause the computing device 120 to communicate to the controller 106 that mobile computing nodes 108 are to be identified based on the mobile computing nodes 108 satisfying one or more filters. Selection of the node selection criteria selector 504D can cause the computing device 120 to communicate to the controller 106 that mobile computing nodes 108 are to be identified based on one or more requirements. Selection of any one of the node selection criteria selectors 504 can cause the computing device 120 to display additional UIs for tailoring the filters or requirements, and/or for selecting contacts, users, vehicles, geographic locations, and the like. Some example UIs for entering location are illustrated and described below with reference to FIGS. 5B-5C. It should be understood that these examples are illustrative, and therefore should not be construed as being limiting in any way.

The screen display 500A also can include other options such as a UI control 506. Selection of the UI control 506 can cause the computing device 120 to cancel the accessing of streaming video from a mobile computing node 108. Thus, selection of the UI control 506 can cause the computing device 120 to exit an application, program, routine, or the like, for accessing streaming video. Because additional or alternative controls can be included in the screen display 500A, it should be understood that the example embodiment shown in FIG. 5A is illustrative and therefore should not be construed as being limiting in any way.

Figure 5B:
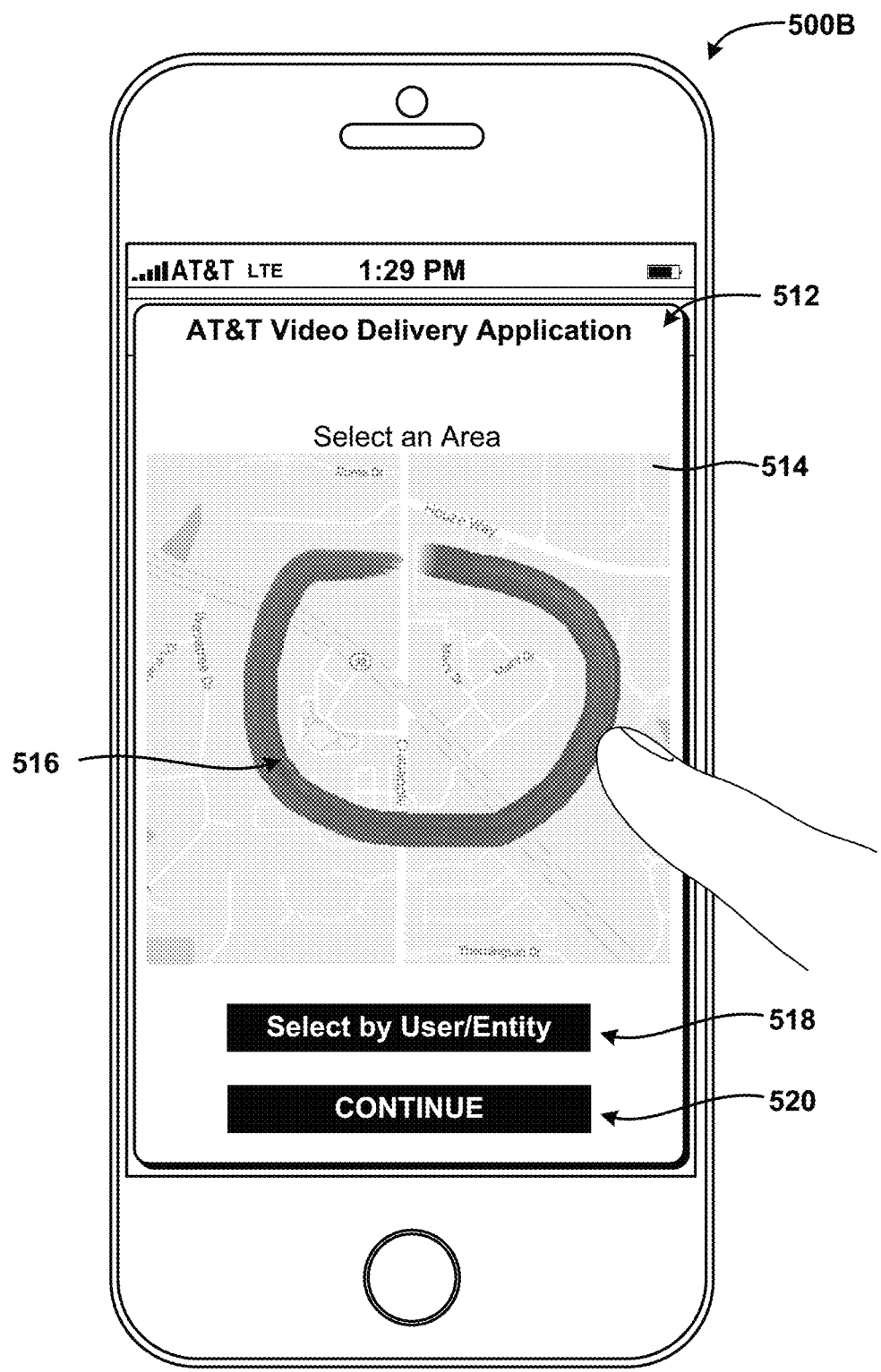

FIG. 5B shows an illustrative screen display 500B. According to some embodiments of the concepts and technologies described herein, the screen display 500B can be generated by a device such as the computing device 120 via interactions with the controller 106 and/or other modules, applications, services, or nodes of the server computer 102. In particular, according to various embodiments, the computing device 120 can generate the screen display 500B and/or other screen displays in conjunction with and/or based upon interactions with the server computer 102 as described herein. As noted above, the computing device 120 can be configured to generate the screen display 500B using data generated at the server computer 102 in some embodiments. It should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

According to various embodiments, the screen display 500B can be presented, for example, when an option to specify a mobile computing node 108 by geographic location is selected or indicated at the computing device 120 (e.g., via selection of the UI control 504B illustrated and described with reference to FIG. 5A). In some other embodiments, the screen display 500B can be presented in response to detecting that an option to access streaming video or other content has been received or selected at the computing device 120. In some contemplated embodiments, an application for obtaining streaming video can be activated at the computing device 120, and the UI illustrated in FIG. 5B can be presented in response to activation of the application. It should be understood that this example is illustrative, and therefore should not be construed as being limiting in any way. Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include an area selection window 512. The area selection window 512 can be configured to enable a user or other entity to specify a geographic location with which the streaming video being requested is associated. The area selection window 512 can include a map view 514. The map view 514 can be used by a user or other entity to specify the geographic location.

The geographic location can be specified in any number of manners. In the illustrated embodiment, a user or other entity can draw a circle or other imaginary line 516 around a portion of the map view 514 that corresponds to a desired geographic location to specify the geographic location. It should be understood that this example is illustrative, and therefore should not be construed as being limiting in any way.

As noted above, the screen display 500B also can include other options such as a UI control 518. Selection of the UI control 518 can cause the computing device 120 to present other UIs for enabling a user or other entity to specify a user, mobile computing node 108, vehicle, or other entity with whom or which the video being requested is associated. It should be understood that this example is illustrative, and therefore should not be construed as being limiting in any way. The screen display 500B also can include an option to continue to a next view for specifying the requested video and/or taking other operations to obtain the requested video. In some embodiments, the selection of the UI control 520 can cause the computing device 120 to submit the request for the video, e.g., the video request 118, to the server computer 102 as illustrated and described herein. Because additional or alternative controls can be included in the area selection window 512, it should be understood that the example embodiment shown in FIG. 5B is illustrative and therefore should not be construed as being limiting in any way.

Figure 5C:
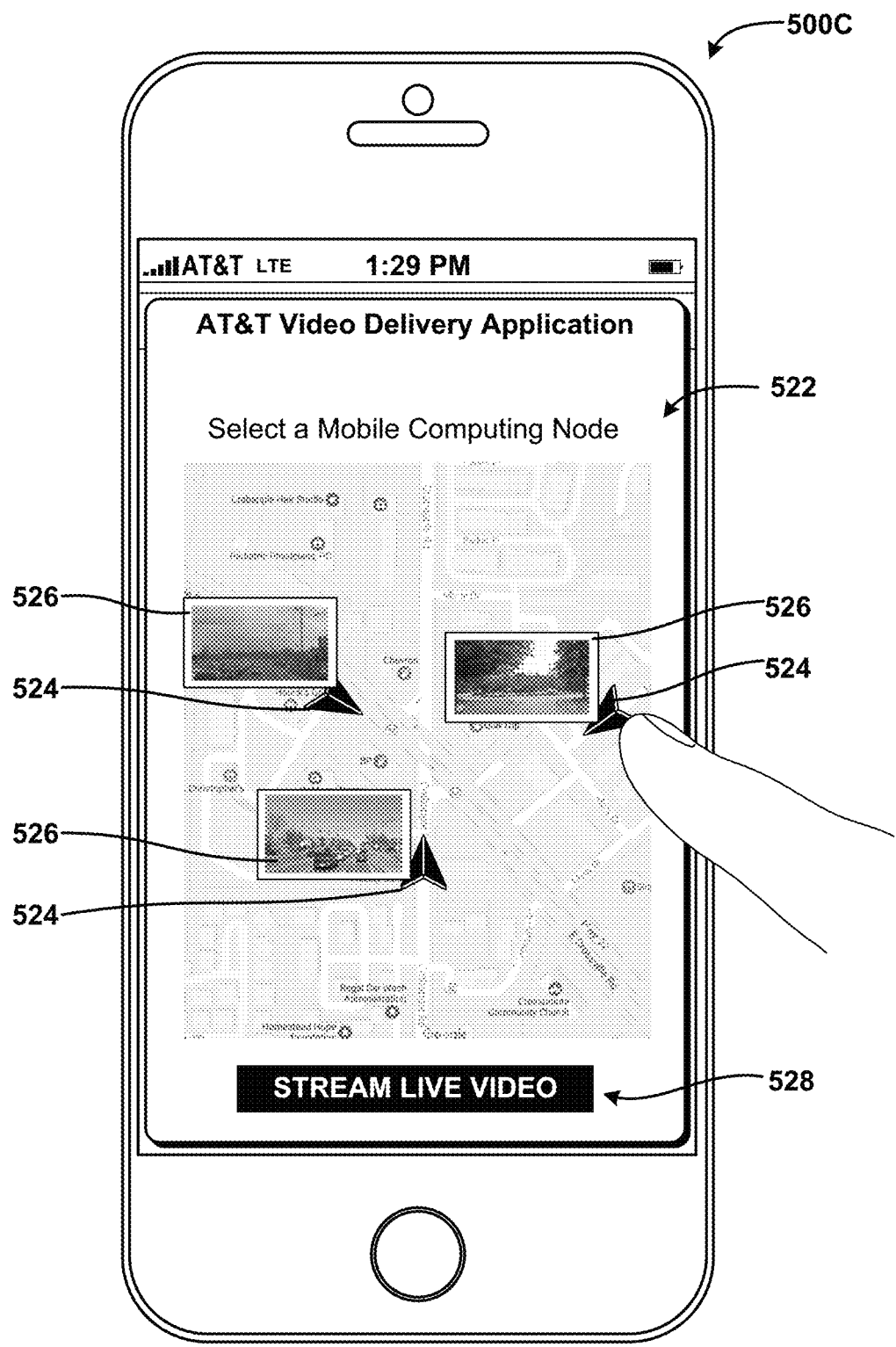

FIG. 5C shows an illustrative screen display 500C. According to some embodiments of the concepts and technologies described herein, the screen display 500C can be generated by a device such as the computing device 120 via interactions with the controller 106 and/or other modules, applications, services, or nodes of the server computer 102. In particular, according to various embodiments, the computing device 120 can generate the screen display 500C and/or other screen displays in conjunction with and/or based upon interactions with the server computer 102 as described herein. It should be appreciated that the UI diagram illustrated in FIG. 5C is illustrative of one contemplated example of the UIs that can be generated and/or displayed in accordance with the concepts and technologies disclosed herein, and therefore should not be construed as being limited in any way.

According to various embodiments, the screen display 500C can be presented, for example, in response to a user or other entity associated with the computing device 120 selecting the UI control 520 illustrated and described above with reference to FIG. 5B. In some other embodiments, the screen display 500C can be presented (e.g., instead of the screen display 500A) when an option to access streaming video or other content is selected at the computing device 120. In some other contemplated embodiments, an application for obtaining streaming video can be activated at the computing device 120, and the UI illustrated in FIG. 5C can be presented in response to activation of the application in addition to, or instead of, the screen display 500A illustrated and described with reference to FIG. 5A. Because the screen display 500C illustrated in FIG. 5C can be displayed at additional and/or alternative times, it should be understood that these examples are illustrative and therefore should not be construed as being limiting in any way.

The screen display 500C can include various menus and/or menu options (not shown in FIG. 5C). The screen display 500C also can include a map display 522. It should be understood that the illustrated map display 522 and/or the screen display 500C is illustrative of only one contemplated embodiment of the "map display" disclosed herein. As such, the illustrated embodiment of the map display 522 should not be construed as being limiting in any way. The map display 522 can be configured to enable a user or other entity to select a mobile computing node 108 from a list 122 of mobile computing nodes 108, which in the illustrated embodiment is provided within the map display 522.

More particularly, the illustrated map display 522 shows three mobile computing nodes 108, as shown by the associated mobile computing node location and bearing indicators 524. As shown, the mobile computing node location and bearing indicators 524 have associated thumbnails 526. The thumbnails 526 show a recent or current image associated with a capture device of the mobile computing nodes 108 associated with the mobile computing node location and bearing indicators 524. Thus, with reference to the map display 522, a user or other entity can ascertain the geographic location of a particular mobile computing node 108, a bearing of the mobile computing node 108, and a view or image associated with a capture device of the mobile computing node 108. This information can assist a user or other entity in selecting which mobile computing node 108 is to stream video to the computing device 120 or other device used to obtain the streaming video. It should be understood that this example is illustrative, and therefore should not be construed as being limiting in any way.

It also can be appreciated that the geographic area shown within the map display 522 can correspond to a geographic location set by a user or other entity, for example via drawing the circle or other imaginary line 516 as illustrated and described with reference to FIG. 5B. In response to detecting the drawing of the circle or other imaginary line 516 and selection of the UI control 520, the computing device 120 can obtain identities of mobile computing nodes 108 at or within the specified area, with those mobile computing nodes 108 being capable of meeting any other requirements and/or satisfying any other filters as illustrated and described herein. It should be understood that this example is illustrative, and therefore should not be construed as being limiting in any way.

Figure 5D:
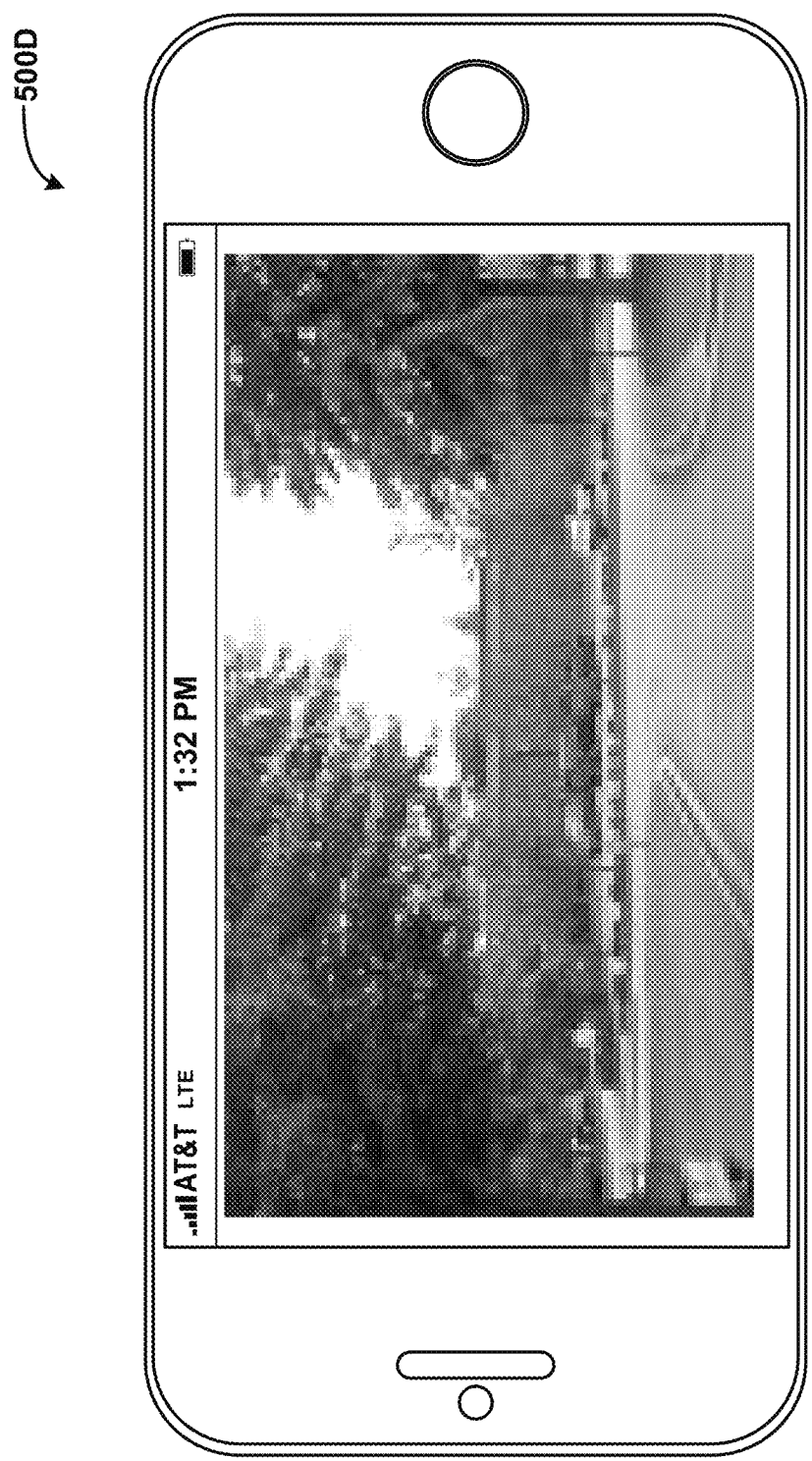

As noted above, the screen display 500C also can include other options such as a UI control 528. Selection of the UI control 528 can cause the computing device 120 to obtain streaming video from a selected mobile computing node 108 (e.g., via selection of one of the mobile computing node location and bearing indicators 524). An example view of the streaming video is shown in FIG. 5D. Because additional or alternative controls can be included in the screen display 500C, it should be understood that the example embodiment shown in FIG. 5C is illustrative and therefore should not be construed as being limiting in any way.

Figure 6:
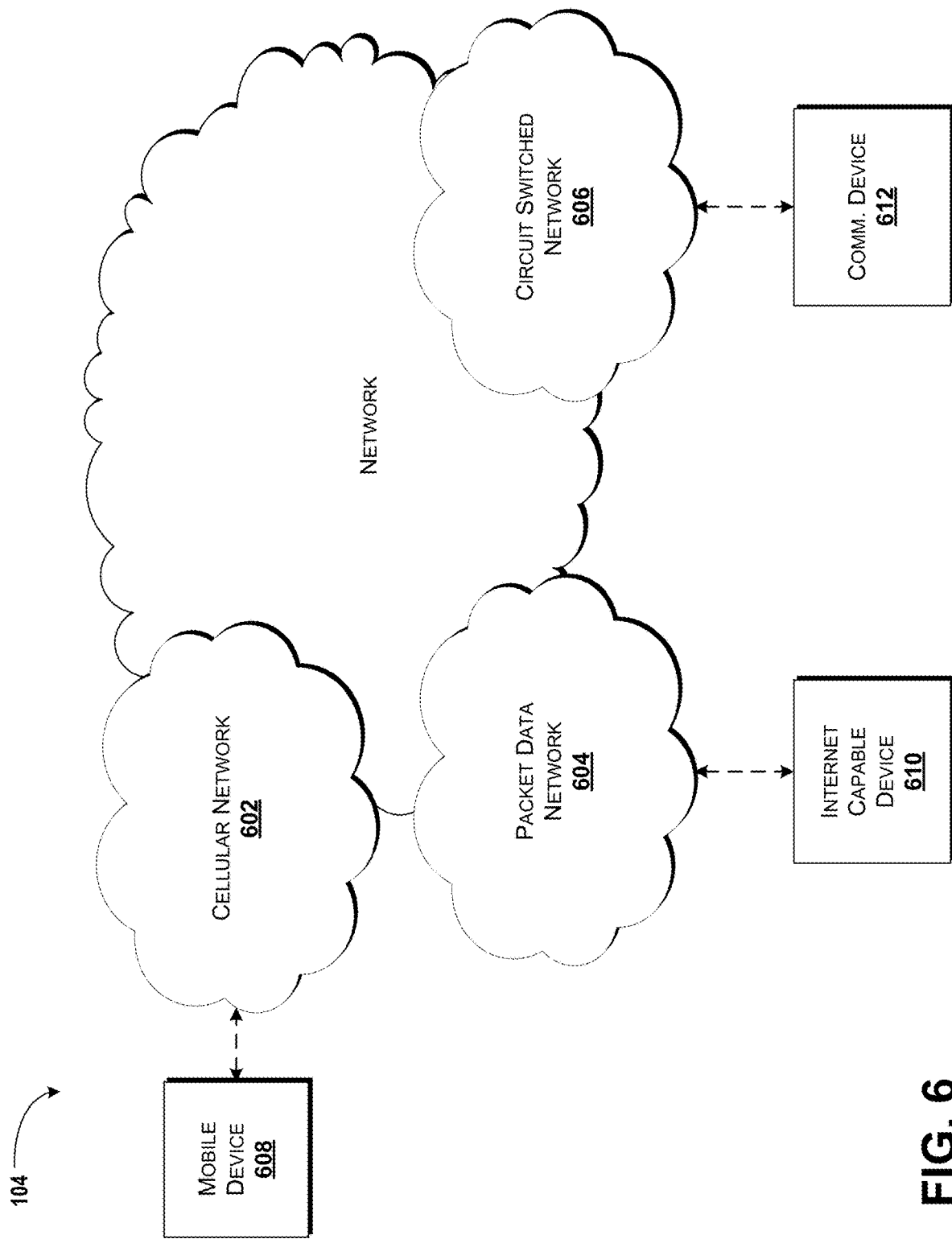
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
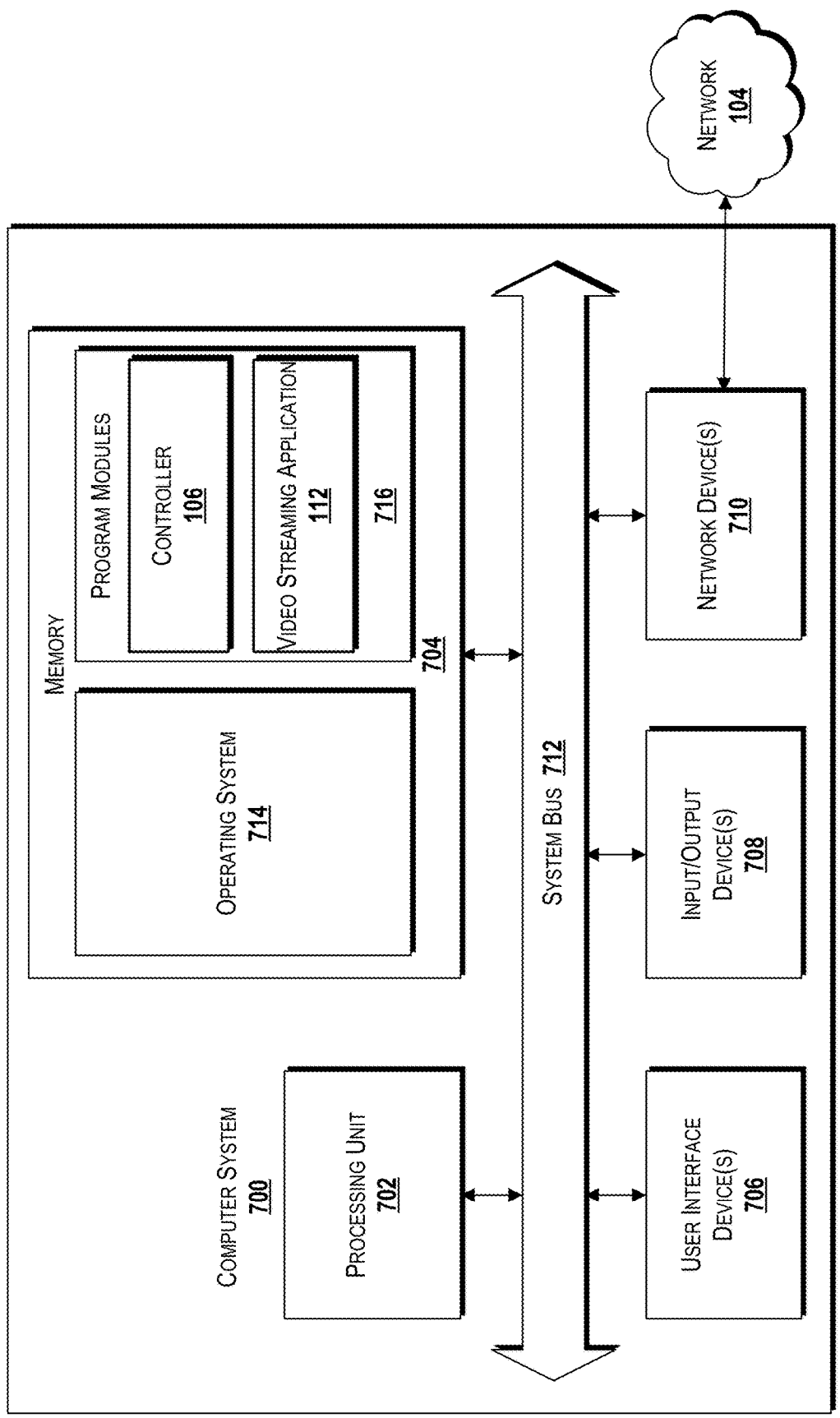
FIG. 7 is a block diagram illustrating an example computer system configured to interact with various devices to provide and/or obtain streaming video from mobile computing nodes, according to some illustrative embodiments of the concepts and technologies described herein.

FIG. 7 is a block diagram illustrating a computer system 700 configured to provide the functionality described herein for providing streaming video from mobile computing nodes, in accordance with various embodiments of the concepts and technologies disclosed herein. In some embodiments, the server computer 102, the mobile computing nodes 108, and/or the computing device 120 described above with reference to FIG. 1 can be configured as and/or can have an architecture similar or identical to the computer system 700 described herein in FIG. 7. It should be understood, however, that the server computer 102, the mobile computing nodes 108, and/or the computing device 120 may or may not include the functionality described herein with reference to FIG. 7. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the controller 106, the video streaming application 112, or other applications, programs, services, modules, or the like. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the inquiry message 114, the inquiry message response 116, the video request 118, the lists 122, the selections 124, the video stream request 126, the video stream 128, the container 130, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
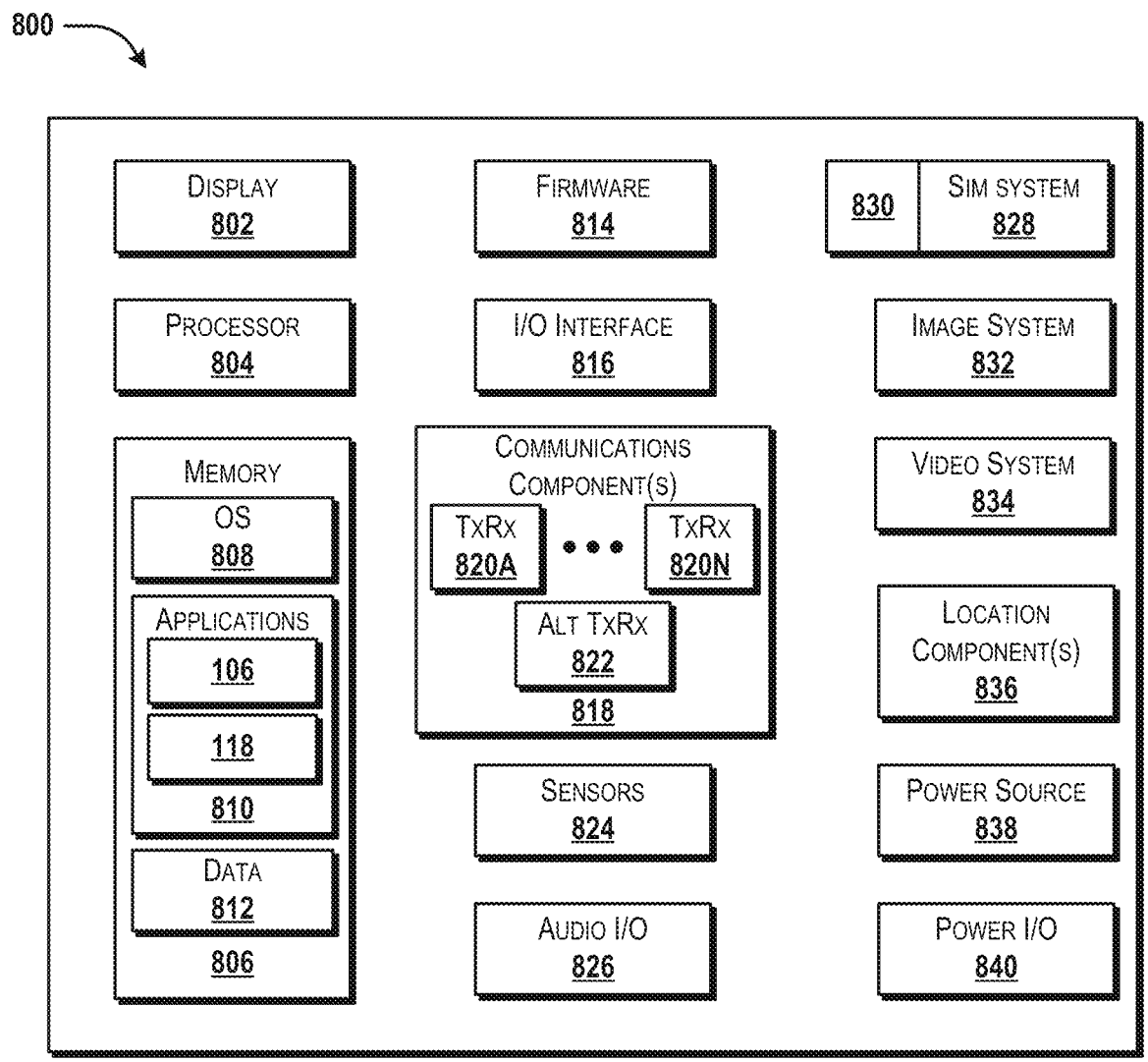
FIG. 8 is a block diagram illustrating an example mobile device configured to interact with various devices to provide and/or obtain streaming video from a mobile computing node, according to some other illustrative embodiments of the concepts and technologies described herein.

Turning now to FIG. 8, an illustrative mobile device 800 and components thereof will be described. In some embodiments, the server computer 102, the mobile computing nodes 108, and/or the computing device 120 described above with reference to FIG. 1 can be configured as and/or can have an architecture similar or identical to the mobile device 800 described herein in FIG. 8. It should be understood, however, that the server computer 102, the mobile computing nodes 108, and/or the computing device 120 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, map displays, map views, lists 122, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the video streaming application 112, the controller 106, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, creating video requests 118 with various parameters, presenting lists 122, making selections 124, viewing video streams 128, configuring settings, manipulating address book content and/or settings, multi-mode interaction, interacting with other applications 810, and otherwise facilitating user interaction with the operating system 808, the applications 810, and/or other types or instances of data 812 that can be stored at the mobile device 800. The data 812 can include, for example, various applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the inquiry message 114, the inquiry message response 116, the video request 118, the lists 122, the selections 124, the video stream request 126, the video stream 128, the container 130, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLU- ETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for providing streaming video from mobile computing nodes have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
a server computer comprising a processor; and
a memory that stores computer-executable instructions that, when executed by the processor, cause the processor to perform operations comprising:
receiving, by the server computer and from a computing device associated with a requestor, a request for streaming video, wherein the streaming video is to be captured by a camera included in a mobile compute node comprising a vehicle, wherein the request specifies a bandwidth requirement and a plurality of filters that define boundaries of a geographic location within which the streaming video is to be captured, a desired resolution for the streaming video, a direction of travel, and a viewing direction that is to be represented by the streaming video, wherein in response to receiving the request, the server computer performs operations comprising:

initiating transmission of an inquiry message, via a broadcast channel, to a plurality of vehicles that comprises the vehicle, wherein the inquiry message comprises data that defines the boundaries of the geographic location, the direction of travel, the desired resolution, and the viewing direction, wherein the mobile compute node is inactive before the transmission of the inquiry message, wherein the mobile compute node wakes in response to receiving the inquiry message, and wherein in response to the inquiry message, the plurality of vehicles determine whether the plurality of filters and the bandwidth requirement associated with the streaming video can be satisfied, receiving, from two or more of the plurality of vehicles, inquiry message responses responsive to the inquiry message, wherein the inquiry message responses indicate whether the plurality of filters and the bandwidth requirement associated with the streaming video can be satisfied, each of the inquiry message responses indicates a current bearing, a current location, and a current orientation, based on the inquiry message responses received, creating a list of vehicles that are located within the boundaries of the geographic location and that can satisfy the plurality of filters and the bandwidth requirement, wherein the list comprises the vehicle, providing the list to the computing device, wherein the list is configured to be presented on a display of the computing device as a map display showing locations of the vehicles that are located within the boundaries of the geographic location and that can satisfy the plurality of filters and the bandwidth requirement, wherein the map display comprises an indicator that depicts a location of the vehicle and the viewing direction, and in response to receiving, from the computing device, a selection of the vehicle from the list, creating, at the server computer, a container for a video stream, instructing the vehicle to begin streaming of the video stream to the container, wherein the vehicle sends the streaming video to the container via a streaming data session between the vehicle and the container, and providing, by the server computer, the video stream from the container to the computing device without a peer-to-peer data session between the vehicle and the computing device.

2. The system of claim 1, wherein the boundaries of the geographic location are defined at the computing device.

3. The system of claim 1, wherein the broadcast channel comprises control channel.

4. The system of claim 1, wherein providing the video stream to the computing device comprises:

initiating another streaming data session between the container and the computing device; and providing the video stream from the container to the computing device via the other streaming data session.

5. The system of claim 1, wherein the boundaries of the geographic location are defined at the computing device via an interaction with a user interface that comprises a map view.

6. The system of claim 1, wherein the plurality of filters further specify a frame capture rate.

7. The system of claim 1, wherein the plurality of filters further specify a speed of a data connection used to stream the streaming video from the vehicle to the container.

8. A method comprising:

receiving, by a server computer and from a computing device associated with a requestor, a request for streaming video, wherein the streaming video is to be captured by a camera included in a mobile compute node comprising a vehicle, wherein the request specifies a bandwidth requirement and a plurality of filters that define boundaries of a geographic location within which the streaming video is to be captured, a desired resolution for the streaming video, a direction of travel, and a viewing direction that is to be represented by the streaming video, wherein in response to receiving the request, the server computer performs operations comprising:

initiating, by the server computer, transmission of an inquiry message, via a broadcast channel, to a plurality of vehicles that comprises the vehicle, wherein the inquiry message comprises data that defines the boundaries of the geographic location, the direction of travel, the desired resolution, and the viewing direction, wherein the mobile compute node is inactive before the transmission of the inquiry message, wherein the mobile compute node wakes in response to receiving the inquiry message, and wherein in response to the inquiry message, the plurality of vehicles determine whether the plurality of filters and the bandwidth requirement associated with the streaming video can be satisfied, receiving, by the server computer and from two or more of the plurality of vehicles, inquiry message responses responsive to the inquiry message, wherein the inquiry message responses indicate whether the plurality of filters and the bandwidth requirement associated with the streaming video can be satisfied, each of the inquiry message responses indicates a current bearing, a current location, and a current orientation, based on the inquiry message responses received, creating, by the server computer, a list of vehicles that are located within the boundaries of the geographic location and that can satisfy the plurality of filters and the bandwidth requirement, wherein the list comprises the vehicle, providing, by the server computer and to the computing device, the list, wherein the list is configured to be presented on a display of the computing device as a map display showing locations of the vehicles that are located within the boundaries of the geographic location and that can satisfy the plurality of filters and the bandwidth requirement, wherein the map display comprises an indicator that depicts a location of the vehicle and the viewing direction, and in response to receiving, from the computing device, a selection of the vehicle from the list, creating, at the server computer, a container for a video stream, instructing the vehicle to begin streaming of the video stream to the container, wherein the vehicle sends the streaming video to the container via a streaming data session between the vehicle and the container, and providing, by the server computer, the video stream from the container to the computing device without a peer-to-peer data session between the vehicle and the computing device.

9. The method of claim 8, wherein the plurality of filters further specify a frame capture rate.

10. The method of claim 8, wherein the broadcast channel comprises a control channel.

11. The method of claim 8, wherein the boundaries of the geographic location are defined at the computing device via an interaction with a user interface that comprises a map view.

12. The method of claim 8, wherein providing the video stream to the computing device comprises:
initiating another streaming data session between the container and the computing device; and
providing the video stream from the container to the computing device via the other streaming data session.

13. The method of claim 8, wherein the plurality of filters further specify a speed of a data connection used to stream the streaming video from the vehicle to the container.

14. A computer storage medium having computer-executable instructions stored thereon that, when executed by a processor, cause the processor to perform operations comprising:
receiving, by a server computer and from a computing device associated with a requestor, a request for streaming video, wherein the streaming video is to be captured by a camera included in a mobile compute node comprising a vehicle, wherein the request specifies a bandwidth requirement and a plurality of filters that define boundaries of a geographic location within which the streaming video is to be captured, a desired resolution for the streaming video, a direction of travel, and a viewing direction that is to be represented by the streaming video, wherein in response to receiving the request, the server computer performs operations comprising:
initiating transmission of an inquiry message, via a broadcast channel, to a plurality of vehicles that comprises the vehicle, wherein the inquiry message comprises data that defines the boundaries of the geographic location, the direction of travel, the desired resolution, and the viewing direction, wherein the mobile compute node is inactive before the transmission of the inquiry message, wherein the mobile compute node wakes in response to receiving the inquiry message, and wherein in response to the inquiry message, the plurality of vehicles determine whether the plurality of filters and the bandwidth requirement associated with the streaming video can be satisfied,
receiving, from two or more of the plurality of vehicles, inquiry message responses responsive to the inquiry message, wherein the inquiry message responses indicate whether the plurality of filters and the bandwidth requirement associated with the streaming video can be satisfied, each of the inquiry message responses indicates a current bearing, a current location, and a current orientation,
based on the inquiry message responses received, creating a list of vehicles that are located within the boundaries of the geographic location and that can satisfy the plurality of filters and the bandwidth requirement, wherein the list comprises the vehicle,
providing the list to the computing device, wherein the list is configured to be presented on a display of the computing device as a map display showing locations of the vehicles that are located within the boundaries of the geographic location and that can satisfy the plurality of filters and the bandwidth requirement, wherein the map display comprises an indicator that depicts a location of the vehicle and the viewing direction, and
in response to receiving, from the computing device, a selection of the vehicle from the list, creating, at the server computer, a container for a video stream, instructing the vehicle to begin streaming of the video stream to the container, wherein the vehicle sends the streaming video to the container via a streaming data session between the vehicle and the container, and providing, by the server computer, the video stream from the container to the computing device without a peer-to-peer data session between the vehicle and the computing device.

15. The computer storage medium of claim 14, wherein the plurality of filters further specify a frame capture rate.

16. The computer storage medium of claim 14, wherein the boundaries of the geographic location are defined at the computing device.

17. The computer storage medium of claim 16, wherein the boundaries of the geographic location are defined via an interaction with a user interface that comprises a map view.

18. The computer storage medium of claim 14, wherein the broadcast channel comprises a control channel.

19. The computer storage medium of claim 14, wherein the plurality of filters further specify a speed of a data connection used to stream the streaming video from the vehicle to the container.

20. The computer storage medium of claim 14, wherein providing the video stream to the computing device comprises:
initiating another streaming data session between the container and the computing device; and
providing the video stream from the container to the computing device via the other streaming data session.

* * * * *